US012609798B2

(12) United States Patent
Seo et al.

(10) Patent No.: US 12,609,798 B2
(45) Date of Patent: Apr. 21, 2026

(54) METHOD AND APPARATUS FOR OBTAINING NONLINEAR INTERFERENCE INFORMATION OF FREQUENCY DOMAIN IN WIRELESS COMMUNICATION SYSTEM

(71) Applicant: Samsung Electronics Co., Ltd., Gyeonggi-do (KR)

(72) Inventors: Bongsung Seo, Gyeonggi-do (KR); Donghyeon Kim, Gyeonggi-do (KR); Yosub Park, Gyeonggi-do (KR); Deokhui Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 300 days.

(21) Appl. No.: 18/588,548

(22) Filed: Feb. 27, 2024

(65) Prior Publication Data

US 2025/0202650 A1 Jun. 19, 2025

(30) Foreign Application Priority Data

Dec. 13, 2023 (KR) ........................ 10-2023-0180688

(51) Int. Cl.
*H04W 72/0453* (2023.01)
*H04L 5/00* (2006.01)

(52) U.S. Cl.
CPC .................................. *H04L 5/0051* (2013.01)

(58) Field of Classification Search
CPC . H04B 1/0475; H04B 1/1027; H04J 11/0036; H04L 5/0048; H04L 5/0051; H04W 72/0446; H04W 72/0453
USPC .......................... 370/252, 278, 329, 430, 442
See application file for complete search history.

(56) References Cited

U.S. PATENT DOCUMENTS

| | | | |
|---|---|---|---|
| 10,763,904 | B2 | 9/2020 | Megretski et al. |
| 12,245,064 | B2 * | 3/2025 | Ryu .................... H04W 72/542 |
| 2007/0135051 | A1 * | 6/2007 | Zheng ................ H04B 7/18513 |
| | | | 455/427 |
| 2016/0316389 | A1 * | 10/2016 | Kim ...................... H04B 17/345 |
| 2021/0297121 | A1 * | 9/2021 | Hao ...................... H04B 7/0456 |
| 2022/0385316 | A1 | 12/2022 | Lozhkin et al. |

FOREIGN PATENT DOCUMENTS

| | | |
|---|---|---|
| WO | WO 2022/073615 | 4/2022 |
| WO | WO 2023/278922 | 1/2023 |
| WO | WO 2023/128311 | 7/2023 |

* cited by examiner

*Primary Examiner* — John Pezzlo
(74) *Attorney, Agent, or Firm* — The Farrell Law Firm, P.C.

(57) ABSTRACT

The disclosure relates to a 5G or 6G communication system for supporting a higher data transmission rate a post-4G communication system such as LTE. A method performed by a UE in a wireless communication system includes receiving first RS-related information for the UE and second RS-related information for an interference UE that is causing nonlinearity interference to the UE, receiving a first RS based on the first RS-related information and a second RS based on the second RS-related information, obtaining first nonlinearity information for nonlinearity of a first signal that a BS transmits to the UE and second nonlinearity information for nonlinearity of a second signal that the BS transmits to the interference UE, based on the first RS and the second RS, and performing NC for a DL signal received from the BS, based on the first nonlinearity information and the second nonlinearity information.

20 Claims, 19 Drawing Sheets

610
received signal 620
nonlinearity
compensation model
(e.g., AI/GMP)

NC without considering interference UE 630
received signal for which nonlinearity
has been compensated

METHOD AND APPARATUS FOR OBTAINING NONLINEAR INTERFERENCE INFORMATION OF FREQUENCY DOMAIN IN WIRELESS COMMUNICATION SYSTEM

CROSS-REFERENCE TO RELATED APPLICATION(S)

This application is based on and claims priority under 35 U.S.C. § 119 to Korean Patent Application No. 10-2023-0180688, which was filed in the Korean Intellectual Property Office on Dec. 13, 2023, the entire disclosure of which is incorporated herein by reference.

BACKGROUND

1. Field

The disclosure relates generally to a wireless communication system, and more specifically, to a method and an apparatus for acquiring non-linear information of a frequency domain interference signal.

2. Description of Related Art

Development of mobile communication has mostly been directed to technologies for services targeting humans, such as voice-based services, multimedia services, and data services. However, it is expected that an increasing number of connected devices, i.e., things, will be connected to communication networks. Examples of things connected to networks may include vehicles, robots, drones, home appliances, displays, smart sensors connected to various infrastructures, construction machines, and factory equipment.

Mobile devices are also expected to evolve in various formfactors, such as augmented reality glasses, virtual reality headsets, and hologram devices.

In order to provide various services by connecting hundreds of billions of devices and things in a $6^{th}$ generation (6G) era, there are ongoing efforts to develop improved 6G communication systems, which may also be referred to as beyond-$5^{th}$ generation (5G) systems.

6G communication systems, which are expected to be implemented approximately by 2030, will have a maximum transmission rate of tera (1,000 giga)-level bps and a radio latency of 100 µsec, and thus, should be 50 times as fast as 5G communication systems and have the $\frac{1}{10}$ radio latency thereof.

In order to accomplish such a high data transmission rate and an ultra-low latency, 6G communication systems are intended to operate in a terahertz (THz) band (e.g., 95 GHz to 3 THz bands). Due to severer path loss and atmospheric absorption in the THz bands than those in mm Wave bands introduced in 5G, a need will likely exist for a technology capable of securing the signal transmission distance (i.e., coverage). Accordingly, technologies are being developed for securing the coverage, such as multiantenna transmission technologies including radio frequency (RF) elements, antennas, novel waveforms having a better coverage than orthogonal frequency division multiplexing (OFDM), beamforming and massive multiple input, multiple output (MIMO), full dimensional MIMO (FD-MIMO), array antennas, and large-scale antennas.

In addition, there are ongoing discussions on new technologies for improving the coverage of THz band signals, such as metamaterial-based lenses and antennas, orbital angular momentum (OAM), and reconfigurable intelligent surface (RIS).

To improve frequency efficiencies and system networks, various technologies have been developed for 6G communication systems, such as: a full-duplex technology for an uplink (UL) (i.e., a user equipment (UE) transmission) and a downlink (DL) (i.e., a node B transmission) to simultaneously use the same frequency resource at the same time; a network technology for utilizing satellites, high-altitude platform stations (HAPS), etc., in an integrated manner; a network structure innovation technology for supporting mobile nodes B and the like and allowing network operation optimization and automation, etc.; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (e.g., mobile edge computing (MEC), clouds, etc.).

In addition, attempts are being made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

Such research and development of 6G communication systems should allow the next hyper-connected experience in new dimensions through the hyper-connectivity of 6G communication systems that covers both connections between things and connections between humans and things. Particularly, it is expected that services such as truly immersive extended reality (XR), high-fidelity mobile holograms, and digital replicas could be provided through 6G communication systems. In addition, with enhanced security and reliability, services such as remote surgery, industrial automation, and emergency response will be provided through 6G communication systems, and thus, these services will be applied to various fields including industrial, medical, automobile, and home appliance fields.

With the advance of wireless communication systems as described above, various services can be provided, and accordingly there is a need for schemes to smoothly provide these services. Specifically, in wireless communication systems, the non-linearity of a signal transmitted/received between a terminal and a base station (BS) may cause problems, and as such, a need exists for methods to acquire information related to the non-linearity of a signal transmitted/received between a terminal and a BS and remove the non-linearity.

The above information is presented as background information only to assist with an understanding of the disclosure. No determination has been made, and no assertion is made, as to whether any of the above might be applicable as prior art with regard to the disclosure.

SUMMARY

This disclosure has been made to address at least the above-mentioned problems and/or disadvantages and to provide at least the advantages described below.

An aspect of the disclosure is to provide a method and an apparatus for acquiring nonlinearity information of an interference signal in a frequency domain in a mobile communication system and thus improve performance of nonlinearity compensation (NC).

Another aspect of the disclosure is to prove a method and an apparatus for acquiring nonlinearity information of an interference signal in a frequency domain in a mobile communication system.

In accordance with an aspect of the disclosure, a method performed by a UE in a wireless communication system is provided, which includes receiving first reference signal (RS)-related information for the UE and second RS-related information for an interference UE that is causing nonlinearity interference to the UE, receiving a first RS based on the first RS-related information and a second RS based on the second RS-related information, acquiring first nonlinearity information for nonlinearity of a first signal that a BS transmits to the UE and second nonlinearity information for nonlinearity of a second signal that the BS transmits to the interference UE, based on the first RS and the second RS, and performing NC for a DL signal received from the BS, based on the first nonlinearity information and the second nonlinearity information.

In accordance with another aspect of the disclosure, a method performed by a BS in a wireless communication system is provided, which includes receiving first RS-related information for a UE and second RS-related information for an interference UE that is causing nonlinearity interference to the UE, receiving a first RS based on the first RS-related information and a second RS based on the second RS-related information, acquiring first nonlinearity information for nonlinearity of a first signal transmitted and received between the BS and the UE and second nonlinearity information for nonlinearity of a second signal transmitted and received between the BS and the interference UE, based on the first RS and the second RS, and performing NC for a UL signal received from the UE, based on the first nonlinearity information and the second nonlinearity information.

In accordance with another aspect of the disclosure, a UE is provided for use in a wireless communication system. The UE includes a transceiver and a processor, wherein the processor is configured to receive first RS-related information for the UE and second RS-related information for an interference UE that is causing nonlinearity interference to the UE, receive a first RS based on the first RS-related information and a second RS based on the second RS-related information, acquire first nonlinearity information for nonlinearity of a first signal that a BS transmits to the UE and second nonlinearity information for nonlinearity of a second signal that the BS transmits to the interference UE, based on the first RS and the second RS, and perform NC for a DL signal received from the BS, based on the first nonlinearity information and the second nonlinearity information.

In accordance with another aspect of the disclosure, a BS is provided for use in a communication system. The BS includes a transceiver and a processor, wherein the processor is configured to receive first RS-related information for a UE and second RS-related information for an interference UE that is causing nonlinearity interference to the UE, receive a first RS based on the first RS-related information and a second RS based on the second RS-related information, acquire first nonlinearity information for nonlinearity of a first signal transmitted and received between the BS and the UE and second nonlinearity information for nonlinearity of a second signal transmitted and received between the BS and the interference UE, based on the first RS and the second RS, and perform NC for a UL signal received from the UE, based on the first nonlinearity information and the second nonlinearity information.

BRIEF DESCRIPTION OF THE DRAWINGS

The above and other aspects, features, and advantages of certain embodiments of the disclosure will be more apparent from the following description taken in conjunction with the accompanying drawings, in which.

5

Figure 17:
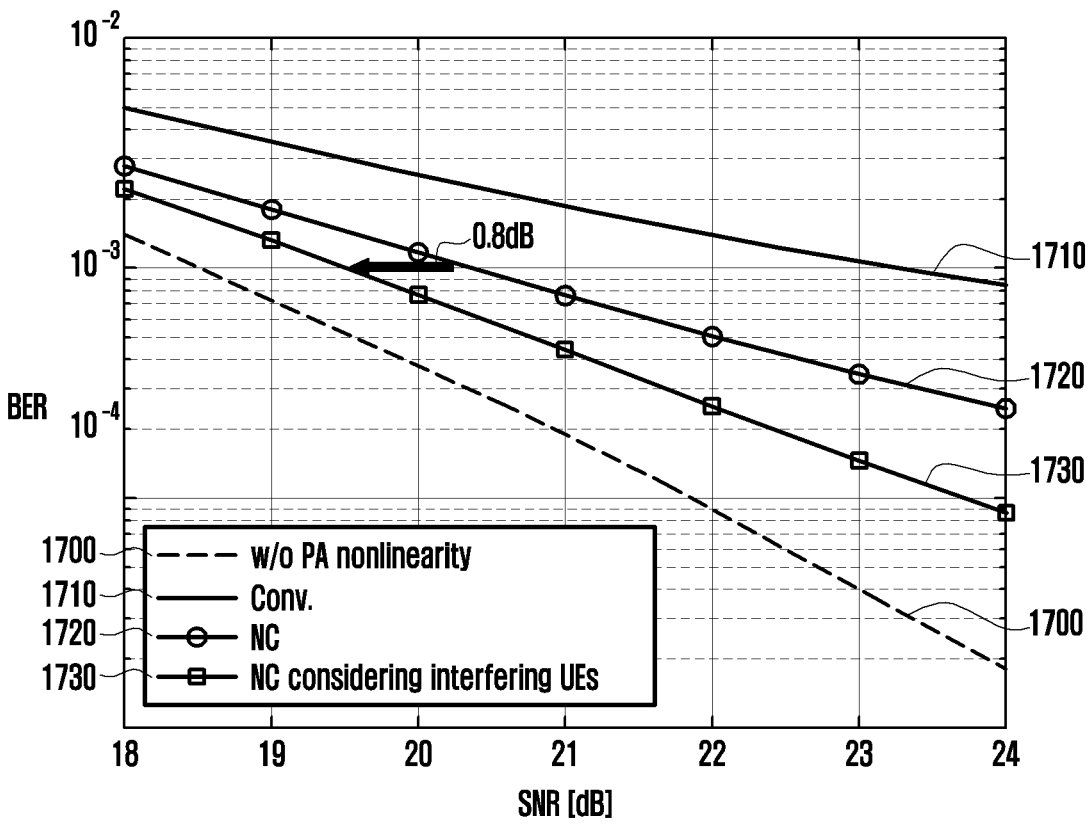
Figure 18:
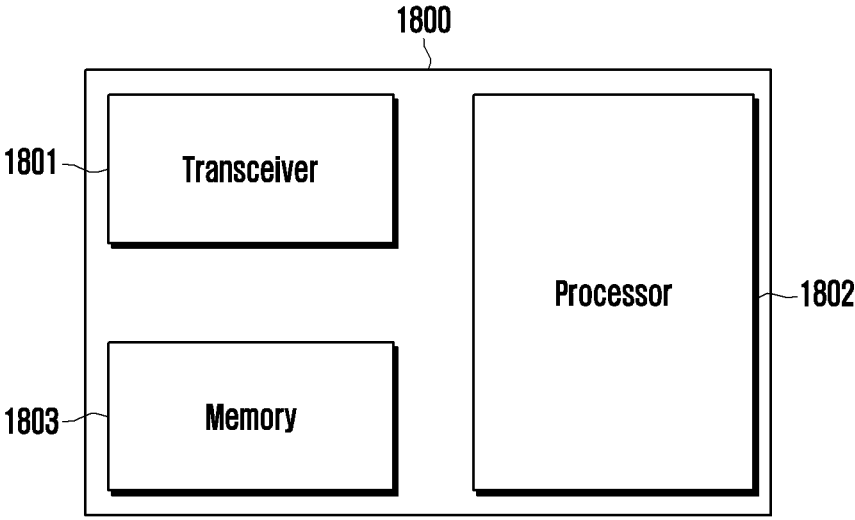

FIG. 17 illustrates NC performance based on nonlinearity information of a target signal and an interference signal in a wireless communication system according to an embodiment;

FIG. 18 illustrates a UE according to an embodiment; and

Figure 19:
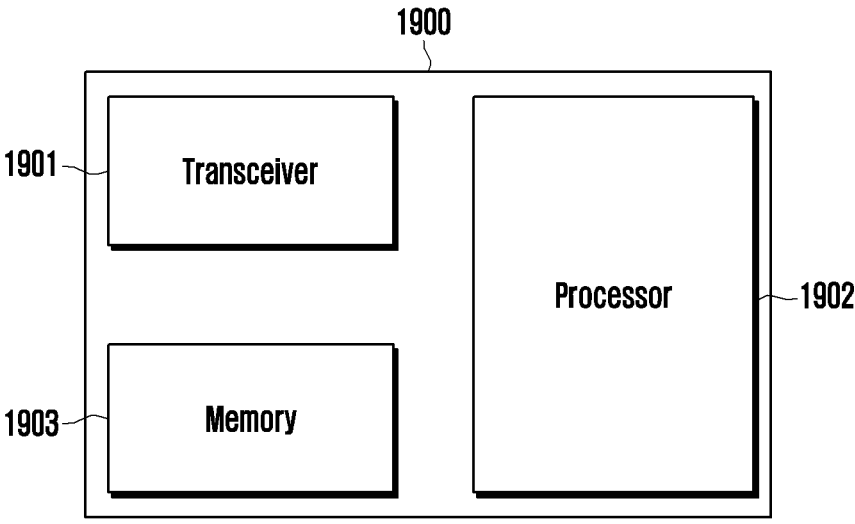

FIG. 19 illustrates a BS according to an embodiment.

DETAILED DESCRIPTION

Hereinafter, various embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

In the accompanying drawings, some elements may be exaggerated, omitted, or schematically illustrated. Furthermore, the size of each element does not completely reflect the actual size. In the drawings, identical or corresponding elements may be provided with identical or corresponding reference numerals.

Advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Throughout the specification, the same or like reference numerals designate the same or like elements.

In describing embodiments of the disclosure, a detailed description of known functions or configurations incorporated herein will be omitted in case that it is determined that the description may make the subject matter of the disclosure unnecessarily unclear.

The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a wireless access unit, a BS controller, and a node on a network. A terminal may include a UE, a mobile station (MS), a cellular phone, a smartphone, a computer, or a multimedia system capable of performing communication functions. In the disclosure, a DL refers to a radio link via which a BS transmits a signal to a terminal, and a UL refers to a radio link via which a terminal transmits a signal to a BS. In the following description, the terms "acquire" and "obtain" can be used interchangeably.

In addition, based on determinations by those skilled in the art, the embodiments of the disclosure may also be applied to other communication systems through some modifications without significantly departing from the scope of the disclosure.

Herein, each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used in the disclosure, singular expressions such as "a", "an", and "the" include plural expressions unless they are definitely indicated otherwise in the context. Also, terms including an ordinal number, such as the expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of protection of the disclosure.

Furthermore, the term "and/or" includes any one or combinations of a plurality of relevant items enumerated.

As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof. Further, the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, as used herein, the expression "report" may be used as the same meaning as "transmit".

The term "pilot signal" may be interchangeably used with the term "RS", "RS signal", or "pilot". Also, the term "transmitter" may be interchangeably used with the term "Tx" or "transmitting end", and the term "receiver" may be interchangeably used with the term "Rx" or "receiving end".

Herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. For example, a "unit" may be constructed either to be stored in an addressable storage medium or to execute one or more processors. Therefore, the "unit" may include software elements, object-oriented software elements, class elements or task elements, processes, functions, properties, procedures, sub-routines, segments of a program code, drivers, firmware, micro-codes, circuits, data, database, data structures, tables, arrays, parameters, etc. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Furthermore, the "unit" in the embodiments may include one or more processors.

Although various embodiments of the disclosure will be described with reference to a long term evolution (LTE)-, LTE advanced (LTE-A)-, NR-, or 6G-based system by way of example, various embodiments of the disclosure may be applied to other communication systems having similar backgrounds or channel types. In addition, based on determinations by those skilled in the art, various embodiments of the disclosure may be applied to other communication systems through some modifications without significantly departing from the scope of the disclosure.

In order to meet various services based on LTE, LTE-A, NR, or 6G, wide bandwidths are needed. Accordingly, research on a high bandwidth, which was not previously used, is being conducted, and is leading to mm Wave and THz research in a 5G communication system and a 6G communication system. However, in an ultra-high frequency band, radio wave path loss is a serious problem, resulting in narrow coverage. Due to this issue, too many BSs are required and initial investment costs, capital expenditures (CAPEX), are high.

In order to compensate for narrow coverage, nonlinearity of a signal passing through a PA increases while further increasing power applied to the PA.

In connection with this, a back-off process of limiting an operating range of the PA with output lower than maximum output power is performed to avoid an operation in a nonlinear area of the PA. In case that a back-off is applied, the probability that a PA input signal is included in a nonlinear area is reduced, and thus deterioration of the data reception performance can be prevented. However, transmission power relatively becomes lower and the problem of not being able to resolve the coverage issue may arise again.

To address these types of problems, discussions on a peak-to-average power ratio (PAPR) reduction technology, a digital pre-distortion (DPD) technology, and an NC technology is in progress, and research on a scheme for resolving nonlinearity using AI is being conducted.

AI may be divided into (i) supervised learning that basically has a ground-truth value and trains a model with the corresponding ground-truth value as a labeling value of training data, (ii) unsupervised learning that derives the relation between data and characteristics of the data in the state in which there is no ground truth value, and (iii) reinforcement learning that trains AI through a compensation system. Among these three categories, supervised learning has a characteristic of training AI to have better performance even though it is difficult to collect labeled data.

AI may include (i) an offline-training scheme of installing a well-trained model from the beginning, and (ii) an online-training scheme of continuously updating a model to reflect an ever-changing environment. In the case of offline training, when a model change is not required, additional training is unnecessary once trained with a large data dataset. That is, the corresponding model is trained in advance during a chip design process and the trained AI model is installed in an algorithm of the chip. However, in case that the environment continuously changes, it is difficult to reflect the changing environment with a fixed model, so online training of continuously updating the model may be necessary.

As various services can be provided according to the above description and the development of the mobile communication system, a method of improving data reception performance and increasing coverage especially through compensation for nonlinearity of the PA is required.

Figure 1:
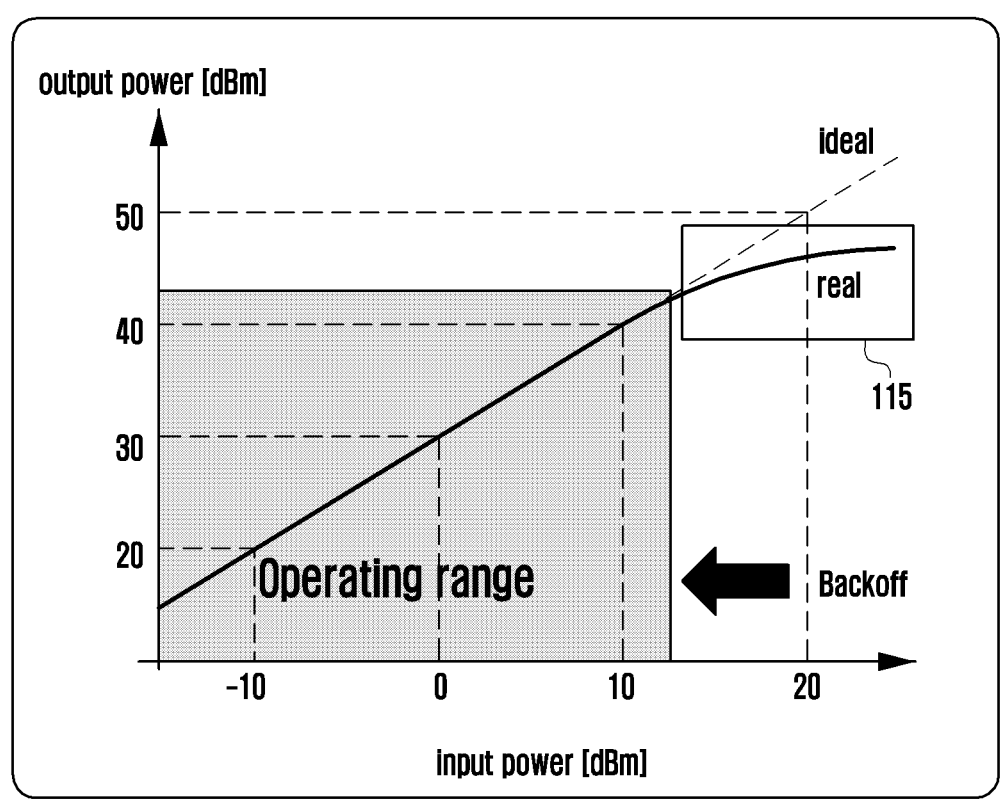
FIG. 1 illustrates nonlinearity of a power amplifier (PA) according to an embodiment.

FIG. 1 illustrates nonlinearity of a PA according to an embodiment.

Referring to FIG. 1, reference numeral 100 indicates output power compared to input power of the PA in the x axis (input power) and the y axis (output power), and reference numeral 110 indicates output power compared to input power of the real PA in the x axis (input power) and the y axis (output power).

An ideal PA has a characteristic of determining input power and output power by a power gain, and the characteristic does not change even if the size of input power is larger than or equal to a specific size. Because of properties of the ideal PA, reference numeral 100 may be expressed as a linear function or in the form of a straight line, and the ideal PA may indicate linearity.

In the case of the real PA, the ratio of input power and output power is determined by a power gain like the ideal PA. However, in case that the size of the input power is larger than or equal to a specific size, such a characteristic does not appear. That is, in case that the size of the input power is larger than or equal to the specific size, the size of the output power is not proportional to the size of the input power any more, and thus the input power and the output power cannot be expressed as the linear function or in the form of the straight line and may have the form of a curved line as indicated by reference numeral 115. Since the ratio of input power and output power is not consistent in a specific area, the real PA cannot be expressed in the linear function or in the form of the straight line, and this property may be nonlinearity. Accordingly, the real PA may have the property of nonlinearity.

A range in which the ratio of input power and the output power of the real PA is not consistent may be an operating range, and a range outside the operating range may be a nonlinear range or a nonlinear area. A process of limiting the operating range of the PA in order to prevent the generation of nonlinearity in the nonlinear area may be a back-off process.

As described above, the real PA may be a nonlinear element indicating nonlinearity in that the real PA cannot have linearity in a range above a specific range. A signal passing through the PA corresponding to the nonlinear element may be expressed as a signal including nonlinearity.

Figure 2:
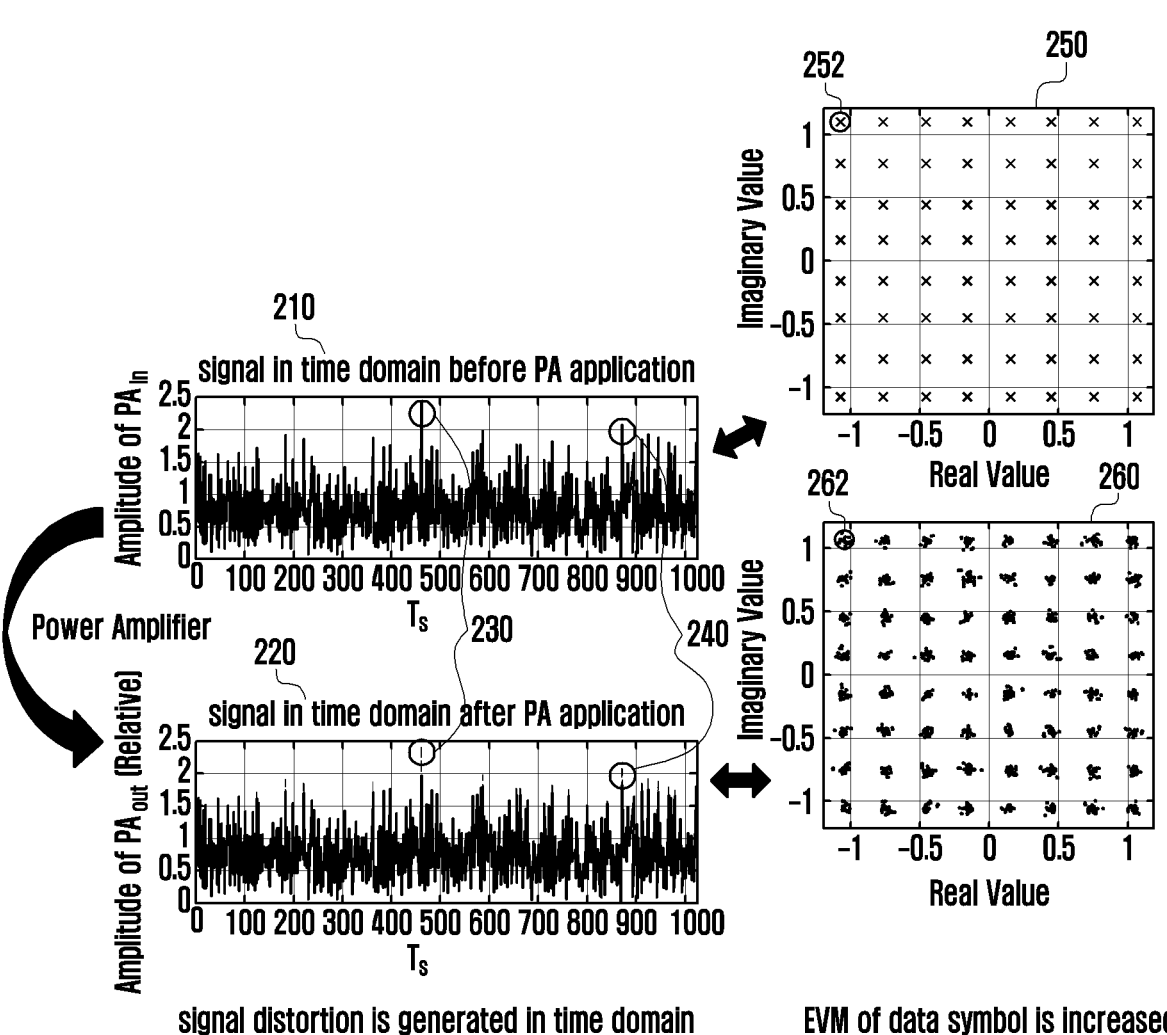
FIG. 2 illustrates a transmitted signal being distorted by nonlinearity of a power amplifier according to an embodiment.

FIG. 2 illustrates a transmitted signal being distorted by nonlinearity of a PA according to an embodiment.

Referring to FIG. 2, the PA is the nonlinear element indicating nonlinearity, and the signal transmitted through the PA may include nonlinearity. The signal including nonlinearity may be expressed as a signal distorted from the existing signal or may indicate signal distortion due to nonlinearity of the nonlinear element.

Reference numeral 210 may be a signal, which has not passed through the PA, in the x axis (time domain) and the y axis (amplitude of the PA, and reference numeral 220 may be a relative value of a signal passing through the PA in the x axis (time domain) and the y axis (amplitude of the PA). The relative value of the signal passing through the PA may be a value obtained by dividing the signal passing through the PA by a power gain. Accordingly, if there is no signal distortion, relative values of the signal, which has not passed through the PA, and the signal, which has passed through the PA, may be the same.

Reference numerals 210 and 220 may be signals in the time domain of a system based on OFDM waveform.

In comparison between shapes of reference numerals 210 and 220, it may be identified that signal distortion due to nonlinearity is generated during a process of passing through the PA in that there is difference therebetween. Further, in comparison between shapes of reference numerals 210 and 220, the signal distortion may be larger as transmission power of the signal is higher. For example, in comparison between shapes of reference numerals 210 and 220, it may be identified that there is difference near reference numerals 230 and 340, which is because signal distortion is generated near reference numerals 230 and 240. As another example, in comparison between shapes of reference numerals 210 and 220, it may be identified that distortion near 230 is larger than distortion near reference numeral 240 in that the difference in shapes near reference numeral 240 is noticeable than the difference in shapes near reference numeral 230.

Reference numeral 250 indicates reference numeral 210 converted into the frequency domain on constellation, and reference numeral 260 indicates reference numeral 220 converted into the frequency domain on constellation. Reference numeral 252 may be one data symbol included in constellation 250, and reference numeral 262 may be one data symbol included in constellation 260. In comparison between reference numerals 252 and 262, reference numeral 262 is spread relatively wider, and in this respect, error vector magnitude (EVM) of reference numeral 262 may be larger. In that reference numeral 262 is a data symbol of a signal having passed through the PA and reference numeral 252 is a data symbol of a signal having not passed through the PA, it may be identified that EVM of the transmission data symbol increases due to nonlinearity of the PA. Reference numerals 250 and 260 may be quadrature amplitude modulation (QAM) symbols in the system based on OFDM waveform.

To summarize FIG. 2, signal distortion due to nonlinearity may be generated during the process of passing through the PA corresponding to the nonlinear element, and accordingly, data reception performance may deteriorate and there may be difficulty in transmission and reception of the signal including nonlinearity.

Figure 3:
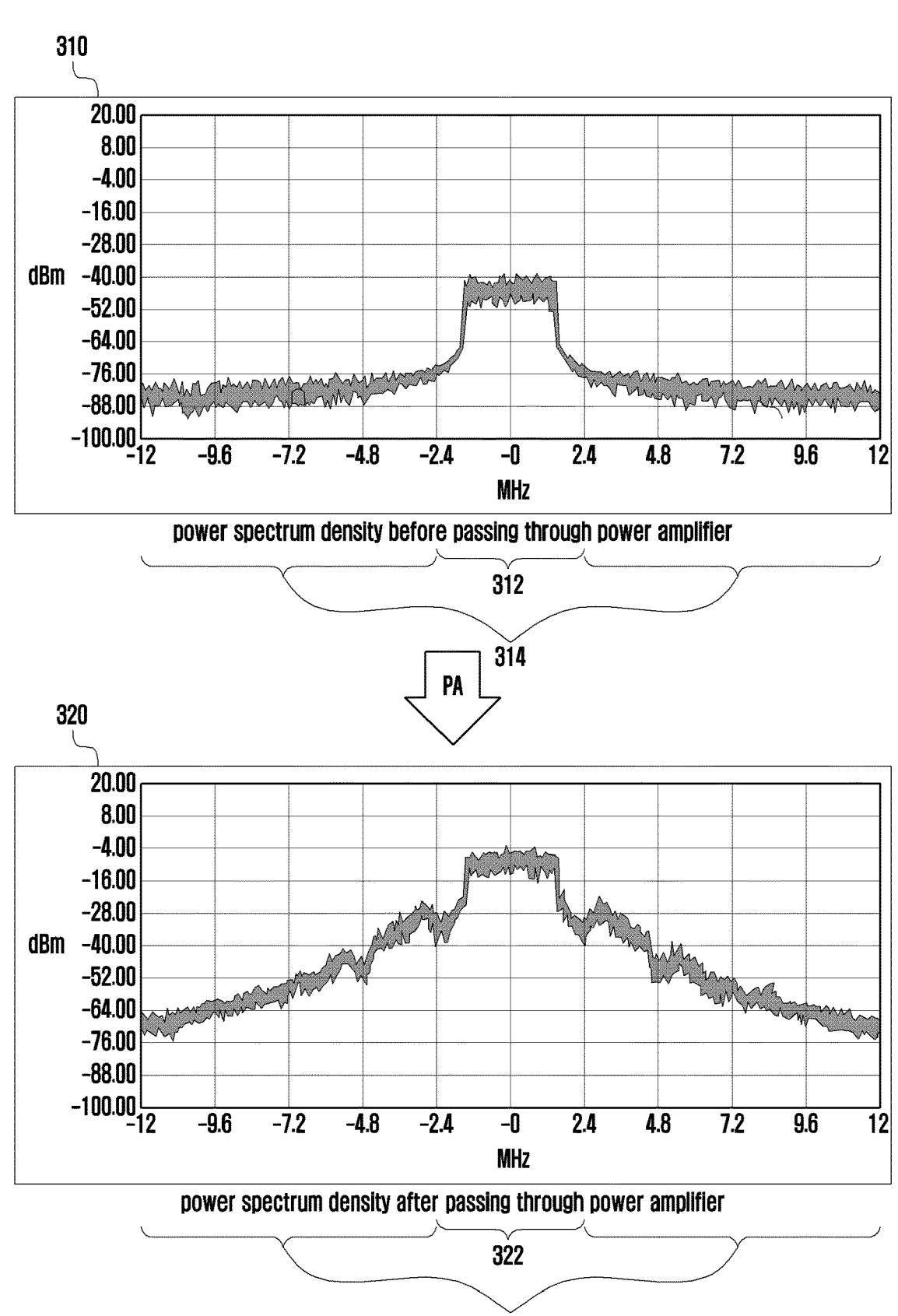
FIG. 3 illustrates power spectrum density (PSD) of a transmitted signal before and after passing through a PA according to an embodiment.

FIG. 3 illustrates PSD of a transmitted signal before and after passing through a PA according to an embodiment.

Reference numeral 310 illustrates a signal having not passed through the PA in the x axis (frequency domain and the y axis (PSD), and reference numeral 320 illustrates a signal having passed through the PA in the x axis (frequency domain and the y axis (PSD).

In the case of reference numeral 310, the PSD of a specific frequency domain 312 is near −46 and the PSD of a specific frequency domain 314 is near −82, and accordingly, it may be expected that the signal is transmitted through resource blocks of the specific frequency domain 312.

In the case of reference numeral 320, it may be identified that the difference between the PSD in a specific frequency domain 322 and the PSD in another frequency domain 324 is relatively smaller than the case of reference numeral 310. The reason why the difference in the PSD between the specific frequency area and the other frequency area is smaller than the case of reference numeral 310 may be relevant to the generation of nonlinearity of the transmitted signal in case that the transmitted signal passes through the PA corresponding to the nonlinear element.

In case that nonlinearity is generated in the transmitted signal, modulation between subcarriers (inter modulation) may be generated, and the signal may be radiated from the specific frequency domain 322 to the other frequency domain 324 due to the inter modulation.

Accordingly, when the signal including nonlinearity is transmitted through resource blocks of the specific frequency domain 322, the signal can also be transmitted through resource blocks of the other frequency domain 324 as a result of the signal radiation. If information indicating that some signals are transmitted through resource blocks of the other frequency domain 324 is not known, the entity receiving the signal may have difficulty in seamlessly receiving data.

Figure 4:
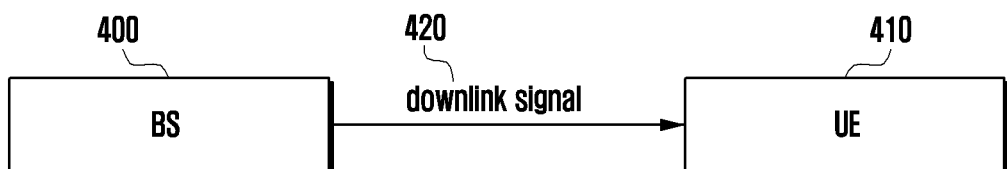
FIG. 4 illustrates a BS transmitting a DL signal to a UE in a wireless communication system according to an embodiment.

FIG. 4 illustrates a BS transmitting a DL signal to a UE in a wireless communication system according to an embodiment.

Referring to FIG. 4, a DL signal 420, which a BS 400 transmits to a UE 410, may pass through a nonlinear element within the BS 400, and accordingly, the DL signal 420 may include nonlinearity. For example, the nonlinearity element may be a PA, and the PA may be used to amplify output power of a signal for the purpose of increasing coverage.

The DL signal 420 including nonlinearity may radiate a signal to adjacent frequency resource blocks, and thus the DL signal may deteriorate. Accordingly, the UE 410 may have difficulty in seamlessly receiving data from the BS 400 based on the DL signal 420 including nonlinearity. To address this type of problem, a method of correcting nonlinearity of a transmitted/received signal to make seamless data transmission/reception possible in a wireless communication system is provided.

The nonlinearity correction method may include, e.g., a PAPR reduction technology, a DPD technology, and an NC technology. However, the technologies are only examples of the NC method and do not limit the technical scope of the disclosure.

According to an embodiment of the disclosure, NC may be used to compensate for signal distortion due to nonlinearity of a receiving side. NC may include (i) a process in which the receiving side acquires PA input/output relation information and (ii) a process of compensating for nonlinearity of a data part of a received signal on the basis of the PA input/output relation information. The PA input/output relation information may be acquired through comparison between a pattern of a pilot that the transmitting side and the receiving side commonly know and a pilot part of the signal actually received by the receiving side.

NC may also be referred to as an NC technology, or an NC method. However, the terms do not limit the technical scope of the disclosure.

Figure 5:
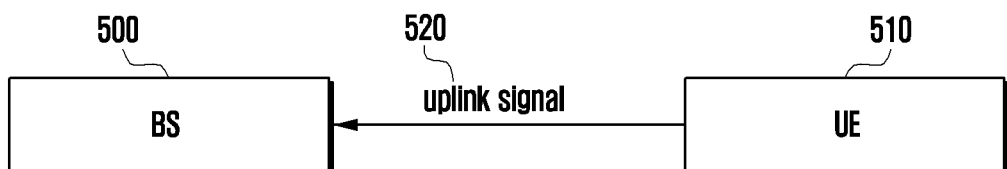
FIG. 5 illustrates a UE transmitting a UL signal to a BS in a wireless communication system according to an embodiment.

FIG. 5 illustrates a UE transmitting a UL signal to a BS in a wireless communication system according to an embodiment.

Referring to FIG. 5, a UL signal 520, which a UE 510 transmits to a BS 500, may have passed through a nonlinear element within the UE 510, and accordingly, the UL signal 520 may include nonlinearity. For example, the nonlinear element may be a PA, and the PA may be used to amplify output power of the uplink signal 520.

The UL signal 520 including nonlinearity may radiate a signal to adjacent frequency resource blocks, and thus the UL signal 520 may deteriorate. Accordingly, the BS 500 may have difficulty in seamlessly receiving data from the UE 510 based on the UL signal 520 including nonlinearity. To address this type of problem, a method of correcting nonlinearity of a transmitted/received signal to make seamless data transmission/reception possible in a wireless communication system is provided.

As indicated above, a nonlinearity correction method may include a PAPR reduction technology, a DPD technology, or an NC technology.

Figure 6:
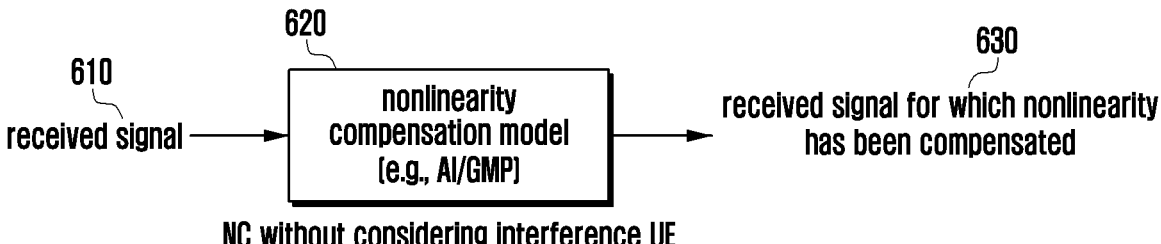
FIG. 6 illustrates a received signal, a nonlinear compensation model through which the received signal passes, and a signal for which nonlinearity is compensated in a wireless communication system according to an embodiment.

FIG. 6 illustrates a received signal, a nonlinear compensation model through which the received signal passes, and a signal for which nonlinearity is compensated in a wireless communication system according to an embodiment.

Referring to FIG. 6, NC is a technology of compensating for signal distortion due to nonlinearity of the receiving side. NC may include a process (i.e., a first process) in which a receiving side acquires nonlinearity information for the received signal and a process (i.e., a second process) of compensating for nonlinearity of the received signal. NC may be performed by a BS when a UL signal is received by the BS, and may be performed by a UE when a DL signal is received by the UE.

The process (first process) of acquiring nonlinearity information of the received signal may include acquiring nonlinearity information after performing channel synchronization. For example, the received signal may include an RS and a data signal, the channel synchronization may be performed based on the RS and information related to the RS, and the nonlinearity information of the received signal may be acquired based on a result value of the channel synchronization, the received RS, and the information related to the RS. Further, an NC model may be generated or supplemented based on the acquired nonlinearity information of the received signal.

The process (second process) of compensating for nonlinearity of the received signal may include compensating for nonlinearity of the received signal using the nonlinearity information acquired through the first process. For example, the received signal may include an RS and a data signal, and a process in which the received data signal passes through the NC model may be the process (second process) of compensating for nonlinearity of the received signal.

In a UL transmission process, reference numeral 610 may indicate a signal including nonlinearity, which the BS receives from the UE, reference numeral 620 may indicate an NC model performing compensation for nonlinearity, and reference numeral 630 may indicate a signal that has passed through the NC model and thus for which nonlinearity has been compensated. The NC model may be interchangeably used with an NC block.

The NC model may perform NC for a time domain signal. For example, the NC model may acquire nonlinearity information indicating signal distortion generated due to nonlinearity of the PA used by the transmitting side and perform NC for the time domain signal on the basis of the nonlinearity information.

For example, the NC model may perform AI-based NC. The NC model may input a pilot part of the signal, to which a channel equalizer (EQ) is applied, to an AI model and optimize an objective function for difference between a result output from the AI model (a value predicted by the pilot received by the receiving side) and a transmission pattern of the pilot which the transmitting side provides to the receiving side (e.g., minimize a loss function or maximize a utility function), so as to train the AI model. That is, the NC model may input a pilot distorted due to nonlinearity of the PA into the AI model and optimize a value predicted by the AI model to be closer to the transmission pattern of the corresponding pilot, so as to train the AI model. Thereafter, the NC model may input a data part of the signal, to which the channel EQ is applied, to the trained AI model and thus acquire data, for which PA nonlinearity is compensated (i.e., data from which distortion due to nonlinearity of the PA has been removed), as an output value of the AI model. The AI model may be implemented by an AI-related algorithm including an echo state network (ESN).

As another example, the NC model may perform NC without the use of AI. The NC model may derive a fitted line that expresses the PA input/output relation by using a pilot part of the received signal and a pilot part of the signal which the receiving side can know in advance. Thereafter, the NC model may put a data part of the signal, to which the channel EQ is applied, to the fitted line, so as to acquire data for which PA nonlinearity has been compensated (i.e., data from which distortion due to nonlinearity of the PA has been removed) as the result value.

In the DL transmission process, reference numeral 610 may indicate a signal including nonlinearity which the UE receives from the BS, reference numeral 620 may indicate an NC model performing NC, and reference numeral 630 may indicate a signal that has passed through the NC model and thus for which nonlinearity has been compensated.

The NC model 630 may be generated or compensated during the process (first process) of acquiring the nonlinearity information of the received signal as described above. The NC model may compensate for nonlinearity using AI or may compensate for nonlinearity using a generalized memory polynomial (GMP). For example, the model that compensates for nonlinearity using AI may be generated after AI trains nonlinearity of the signal based on the acquired nonlinearity information. As another example, the model that compensates for nonlinearity using the GMP may generates an appropriate polynomial based on the acquired nonlinearity information and is based on the generated polynomial.

In connection with the NC process, nonlinearity is a characteristic of the time domain signal, and thus a process of converting the received signal into the time domain signal to perform NC may be included. Further, after the nonlinearity information is acquired, a process of converting the time domain signal into a frequency domain signal may be included. The received signal may be an OFDM-based signal. That is, in connection with NC, a process of converting a symbol mapping or demodulating the received signal in the frequency domain into the time domain may be needed.

To summarize FIG. 6, nonlinearity may be included in the received signal, and the received signal including nonlinearity may become a received signal for which nonlinearity has been compensated after passing through the NC model.

Figure 7:
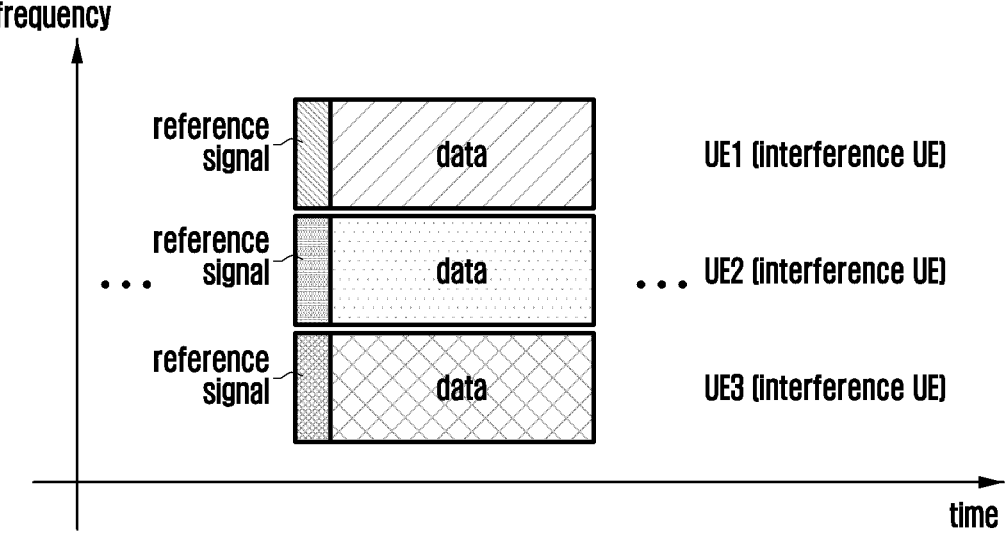
FIG. 7 illustrates a BS simultaneously transmitting signals to three UEs through adjacent frequency resource blocks in a wireless communication system according to an embodiment.

FIG. 7 illustrates a BS simultaneously transmitting signals to three UEs through adjacent frequency resource blocks according to an embodiment.

Referring to FIG. 7, the signal transmitted through the frequency resource block may be a DL signal that includes a pilot signal and a data signal. The simultaneous signal transmission may be refer signal transmission in the same subframe or slot.

A UE having a signal of which reception performance is inspected may be, e.g., a second UE, and the second UE may be a target UE in that the second UE is a target of which reception performance is inspected. A frequency resource block that the BS uses to transmit a signal to the second UE may be a second frequency resource block. Frequency resource blocks adjacent to the second frequency resource block may be a first frequency resource block and a third frequency resource block.

Further, a UE receiving a signal from the BS through the first frequency resource block may be a first UE, and a UE receiving a signal from the BS through the third frequency resource block may be a third UE. The first UE and the third UE may be referred to as adjacent UEs of the second UE in that they receives signals from the BS through frequency resource blocks adjacent to the second frequency resource block used to transmit the signal to the second UE (target UE).

The signal that the BS transmits to the second UE through the second frequency resource block may pass through the nonlinear element within the BS. The nonlinear element may be a PA. The signal transmitted to the second UE via the nonlinear element may be a signal having nonlinearity, and the signal having nonlinearity, as described above, may radiate a signal to an adjacent frequency resource block. Accordingly, a portion of the signal transmitted to the second UE may be transmitted to the first UE or the third UE through the first frequency resource block or the third frequency resource block as the result of radiation.

The BS may transmit a signal to the first UE through the first frequency resource at the same time at which the signal is transmitted to the second UE. The signal transmitted to the first UE may pass through the nonlinear element (e.g., the PA) within the BS, and accordingly, the signal transmitted to the first UE may also be the signal having nonlinearity. A portion of the signal having nonlinearity transmitted to the first UE may also be transmitted to the second UE that is an adjacent UE through the second frequency resource block as the result of radiation.

Similarity, the BS may transmit the signal to the third UE through the third frequency resource at the same time at which the signal is transmitted to the second UE. The signal transmitted to the third UE may also pass through the nonlinear element (e.g., the PA) within the BS, and accordingly, the signal transmitted to the third UE may also be the signal having nonlinearity. A portion of the signal having nonlinearity, transmitted to the third UE, may also be transmitted to the second UE that is an adjacent UE through the second frequency resource block as the result of radiation.

Due to nonlinearity of the transmitted signal, while a portion of the signal which the BS transmits to the second UE may be transmitted to the first UE and the third UE, a portion of the signal which the BS transmits to the first UE and the third UE may be transmitted to the second UE. In case that the portion of the signal transmitted to the first UE and the third UE is transmitted to the second UE, the signal transmitted to the first UE and the third UE may be an interference signal of the signal transmitted to the second UE, and in this sense, the first UE and the third UE may be interference UEs of the second UE. For convenience of description, a signal transmitted and received between a target UE and the BS may be a target signal, and a signal transmitted and received between an interference UE and the BS may be an interference signal.

Considering this, the signal of the BS transmitted to the target UE may be deteriorated by nonlinearity of the signal which the BS transmits to the target UE and nonlinearity of the signal which the BS transmits to the interference UE, and the target UE may receive the deteriorated signal.

FIG. 7 may also be a diagram illustrating that each UE transmits a signal to the BS through an adjacent frequency resource block in the same slot. In this case, the signal transmitted by each UE may be a UL signal including a pilot signal and a data signal. Further, the UL signal may be a signal having nonlinearity, which has passed through the nonlinearity element (e.g., the PA) of the UE, and the UL signal of the target UE may be deteriorated by a UL signal of the interference UE. Considering this, the signal that the target UE transmits to the BS may be deteriorated by nonlinearity of the signal that the target UE transmits to the BS and nonlinearity of the signal which the interference UE transmits to the BS, and the BS may receive the deteriorated signal of the target UE.

In the case of UL link transmission in FIG. 7, some description may be omitted, but the omitted description can be referenced to description of the DL transmission in FIG. 7.

In connection with FIG. 7, the first UE, the second UE, the third UE, the first frequency resource block, the second frequency resource block, the third frequency resource block, the target UE, and the interference UE are only examples for understanding of description, and the disclosure is not limited by the examples.

Figure 8:
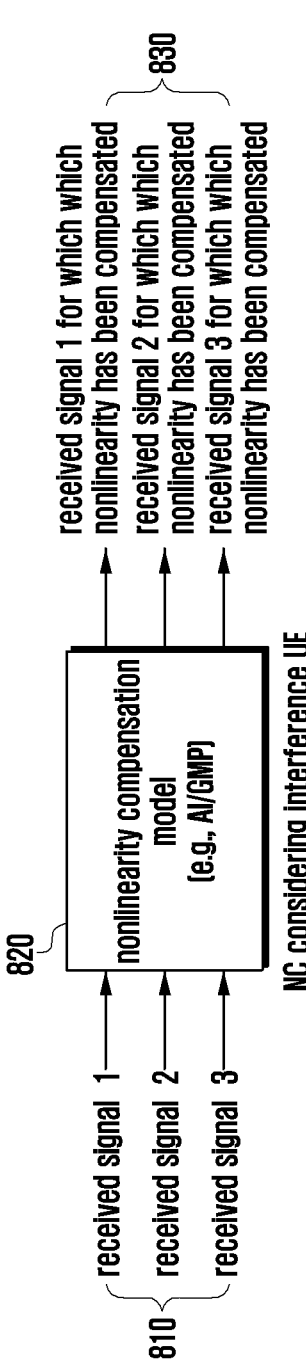
FIG. 8 illustrates a plurality of received signal, an NC model related to the plurality of received signals, and a plurality of signals for which nonlinearity is compensated in a wireless communication system according to an embodiment.

FIG. 8 illustrates a plurality of received signals, an NC model related to the plurality of received signals, and a plurality of signals for which nonlinearity is compensated in a wireless communication system according to an embodiment. That is, similar to FIG. 6, FIG. 8 illustrates an NC process when number of received signals is plural.

Referring to FIG. 8, in a UL transmission process, reference numeral 810 may indicate signals including nonlinearity, received from the first UE to the third UE, reference numeral 820 may indicate a NC model performing NC, and reference numeral 830 may indicate signals for which nonlinearity has been compensated via the nonlinearity model.

In performance of the signal transmitted by the second UE, the second UE may be a target UE in that nonlinearity of the signal transmitted by the second UE is compensated for. Further, the first UE and the third UE may be interference UEs that are transmitting signals at the same time through resource blocks adjacent to a frequency resource block used to transmit the transmission signal of the second UE. Further, for convenience of description, a signal transmitted and received between the target UE and the BS may be a target signal, and a signal transmitted and received between the interference UE and the BS may be an interference signal.

In FIG. 8, unlike FIG. 6, the signal (i.e., the target signal), which the second UE transmits and the BS receives, may include a portion of the signal including not only nonlinearity of the signal transmitted by the target UE (second UE) but also nonlinearity transmitted by the interference UE (first UE and/or third UE). Hereinafter, the signal including the portion of the signal including nonlinearity transmitted by the interference UE may be interchangeably used with the signal including nonlinearity of the interference signal.

Accordingly, the NC model 810 related to the plurality of signals may acquire nonlinearity information of the interference signal as well as nonlinearity information of the target signal and generated based on the acquired nonlinearity information of the target signal and the acquired nonlinearity information of the interference signal.

The NC model related to the plurality of signals may compensate for nonlinearity using AI or may compensate for nonlinearity using a GMP. For example, the model that compensates for nonlinearity using AI may be generated after AI trains nonlinearity of the signal based on the acquired nonlinearity information of the target signal and the interference signal. In another example, the model that compensates for nonlinearity using the GMP may generate an appropriate polynomial based on the acquired nonlinearity information of the target signal and the interference signal and is based on the generated polynomial.

In considering the above description, when a signal received by a receiving side is a UL, a signal transmitted by the second UE (target UE) may be a signal for which nonlinearity of the target signal and the interference signal is compensated via the NC model 810 related to the plurality of received signals.

In a DL transmission process, reference numeral 810 may indicate signals including nonlinearity that the first UE to the third UE transmit to the BS, reference numeral 820 may indicate an NC model performing NC, and reference numeral 830 may indicate signals for which nonlinearity has been compensated via the nonlinearity model.

In performance of the DL signal received by the second UE, the second UE may be a target UE in that nonlinearity of the signal received by the second UE is compensated for. Further, the first UE and the third UE may be interference UEs that are receiving signals from the BS at the same time through resource blocks adjacent to the frequency resource block used to transmit the signal which the BS transmits to the second UE. Further, for convenience of description, a signal transmitted and received between the target UE and the BS may be a target signal, and a signal transmitted and received between the interference UE and the BS may be a interference signal.

Similar to the case in which the signal received by the receiving side is the UL, NC may be performed by the NC model related to the plurality of received signal in the case in which the signal received by the receiving side is the DL.

In case that the signal received by the receiving side is the DL, the signal that the BS transmits to the second UE (target UE) may be a signal for which nonlinearity of the target signal and the interference signal has been compensated via the NC model 810 related to the plurality of signals received by the second UE.

Omitted description of the description related to the case in which the signal received by the receiving side is the DL may be understood with reference to the description related to the case in which the signal received by the receiving side is the UL.

Figure 9:
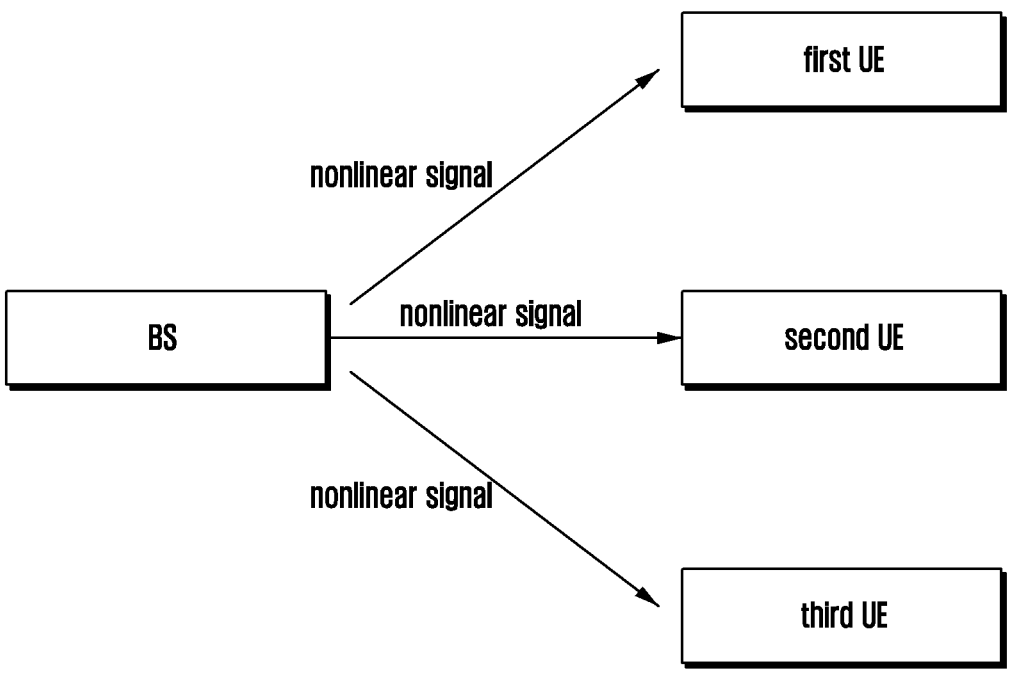
FIG. 9 illustrates a BS transmitting DL signals to a plurality of UEs in a wireless communication system according to an embodiment.

FIG. 9 illustrates a BS transmitting DL signals to a plurality of UEs in a wireless communication system according to an embodiment.

Referring to FIG. 9, a second UE may be a target UE in that a BS measures performance of a DL transmission to the second UE. A first UE and a third UE may be interference UEs in that the BS transmits the DL through a frequency resource block adjacent to the frequency resource block used to transmit the DL to the second UE. Further, a signal transmitted and received between the BS and the second UE (target UE) may be a target signal, and a signal transmitted and received between the BS and the first UE and/or the third UE (interference UE) may be an interference signal.

The DL signal that the BS transmits to the second UE (target UE) may pass through the nonlinearity element within the BS, and accordingly, the DL signal which the BS transmits to the second UE may be a signal including nonlinearity. The nonlinear element may be a PA, and the PA may be used to amplify output power of the signal.

Further, the DL signal that the BS transmits to the first UE and/or the third UE (interference UE) may also pass through the nonlinearity element within the BS, and accordingly, the DL signal which the BS transmits to the interference UE may also be a signal including nonlinearity.

As described above, since the signal including nonlinearity may radiate the signal to an adjacent frequency resource block, a portion of the UL signal which the BS transmits to the interference UE may be transmitted to the target UE through a frequency block of the target signal.

The DL signal of the BS received by the target UE may be deteriorated by nonlinearity of the target signal and nonlinearity of the interference signal of the adjacent first UE and the interference signal of the adjacent second UE. Since there is difficulty in performing seamless data transmission and reception based on the deteriorated signal, compensation for nonlinearity related to the target signal and the interference signal, included in the target signal, may be performed through a NC method.

As described above, NC is a technology of compensating for distortion of a signal due to nonlinearity of a receiving side. NC may include (i) a process in which the receiving side acquires PA input/output relation information and (ii) a process of compensating for nonlinearity of a data part of a received signal based on the PA input/output relation information. The PA input/output relation information may be acquired through comparison between a pattern of a pilot that the transmitting side and the receiving commonly know and a pilot part of the signal actually received by the receiving side.

Figure 10:
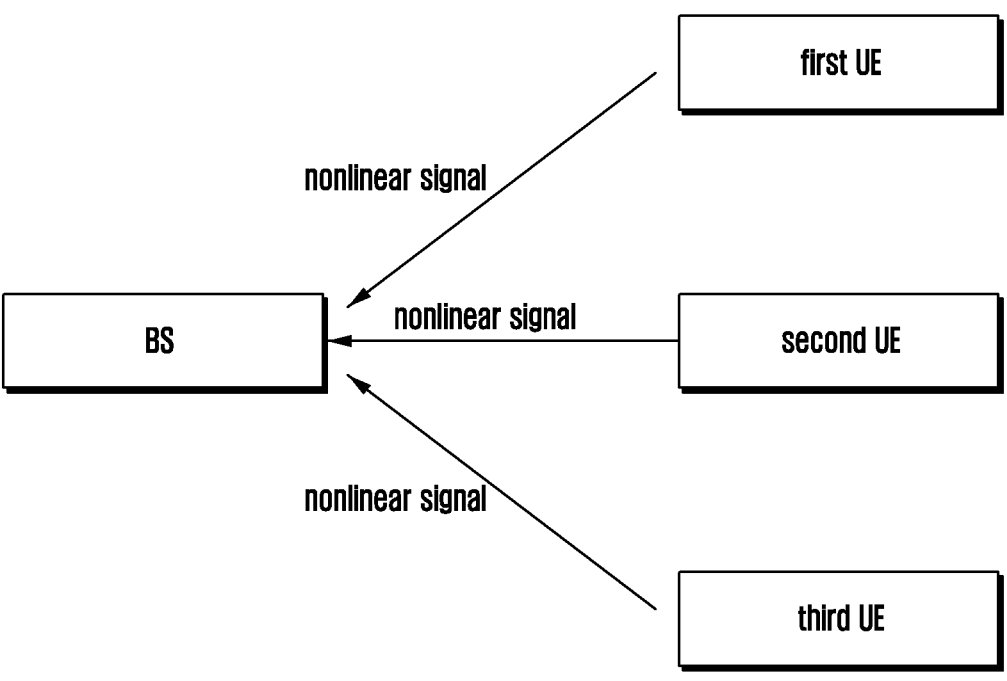
FIG. 10 illustrates a plurality of UEs transmitting UL signals to a BS in a wireless communication system according to an embodiment.

FIG. 10 illustrates a plurality of UEs transmitting UL signals to a BS in a wireless communication system according to an embodiment.

Referring to FIG. 10, a second UE may be a target UE in that the second UE measures performance of DL transmission to the BS. Further, a first UE and a third UE may be interference UEs in that the UL is transmitted to the BS through a frequency resource block adjacent to a frequency resource block used by the second UE to transmit the UL. Further, a signal transmitted and received between the BS and the second UE (target UE) may be a target signal, and a signal transmitted and received between the BS and the first UE and/or the third UE (interference UE) may be an interference signal.

The UL that the second UE (target UE) transmits to the BS may pass through a nonlinearity element within the UE, and accordingly, the UL signal transmitted by the second UE may be a signal including nonlinearity. The nonlinear element may be, e.g., a PA, and the PA may be used to amplify output power of the signal.

The UL signal that the first UE and/or the third UE (target UE) transmits to the BS may also pass through the nonlinearity element within the UE, and accordingly, the UL signal transmitted by the interference UE may also be a signal including nonlinearity.

As described above, since the signal including nonlinearity may radiate the signal to an adjacent frequency resource block, a portion of the UL signal which the interference UE transmits to the BS may be transmitted to the BS through a frequency block of the target signal.

In The UL signal of the target UE received by the BS may be deteriorated by nonlinearity of the target signal and nonlinearity of the interference signal. Since there is difficulty in performing seamless data transmission and reception based on the deteriorated, compensation for nonlinearity related to the target signal and the interference signal, included in the target signal, may be performed through the NC method, as described above.

Figure 11:
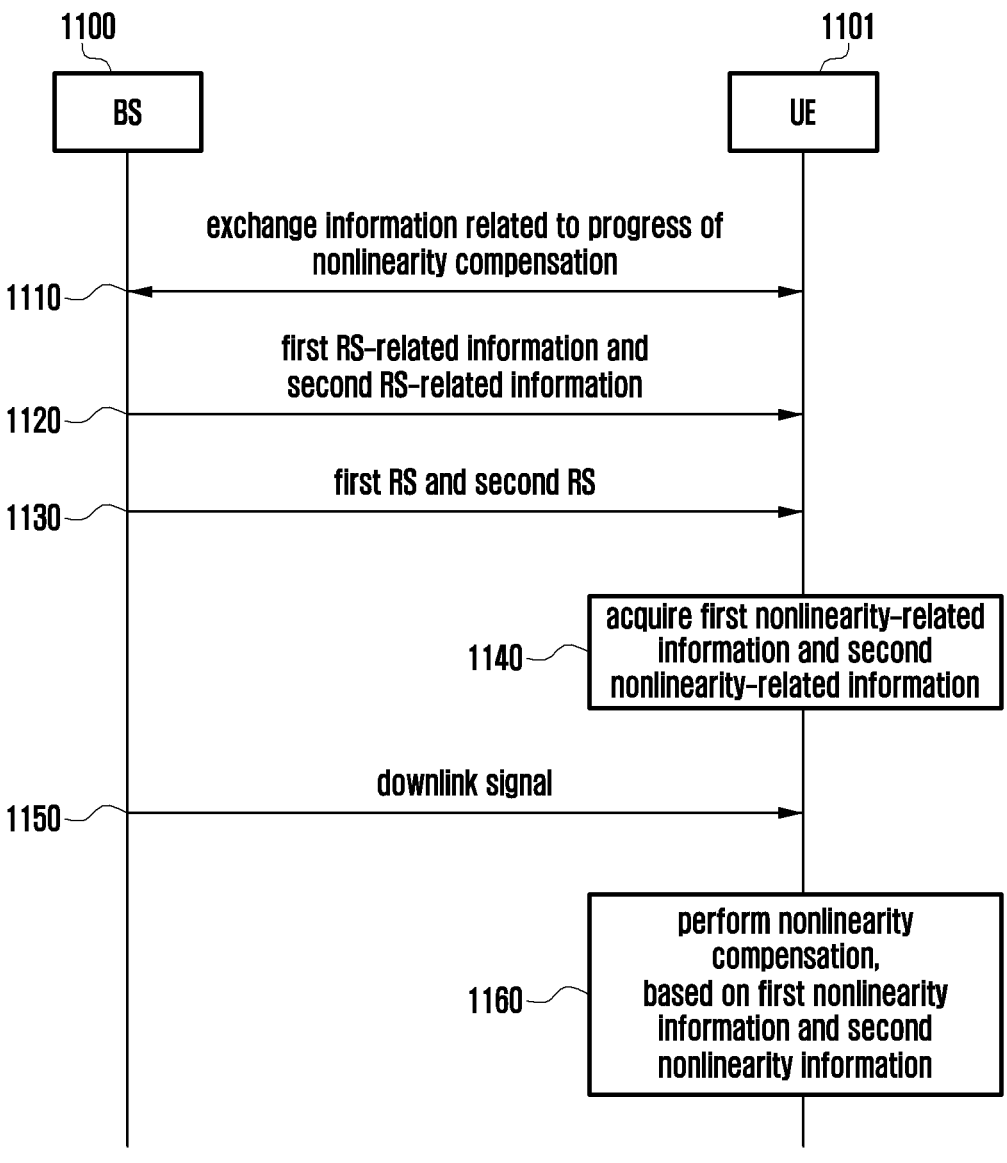
FIG. 11 is a signal flow diagram illustrating nonlinearity of an interference signal being compensated for while a BS transmits a DL signal to a UE in a wireless communication system according to an embodiment.

FIG. 11 is a signal flow diagram illustrating an operation in which nonlinearity of an interference signal is compensated for when a BS transmits a DL signal to a UE in a wireless communication system according to an embodiment.

Referring to FIG. 11, a UE 1101 receiving the DL signal from a BS 1100 may be a target UE in that the UE is a target of which performance of a received signal is inspected. The DL signal which the target UE receives from the BS may be a target signal.

In step 1110, the UE 1101 and the BS 1100 exchange NC-related information. For example, the UE 1101 and the BS 1100 may exchange information related to nonlinearity of the target signal and information on whether the UE 1101 compensates for nonlinearity based on nonlinearity information of the interference signal.

The UE 1101 and the BS 1100 may exchange UE capability information during the process of exchanging the information on whether to perform NC based on nonlinearity information of the interference signal. For example, the UE capability information may include nonlinearity information of the target signal and information on whether to support an NC function based on nonlinearity information of the interference signal.

The BS 1100 may transmit a message inquiring about UE capability information (e.g., a UE capability inquiry message) to the UE 1101.

In response to the inquiry message, the UE 1101 may transmit a message including its own capability information (e.g., a UE capability response message) to the BS 1100. The UE capability inquiry message and the UE capability response message may be radio resource control (RRC) messages. The BS 1100 receiving the UE capability information may identify whether the UE 1101 supports an NC function related to the target signal and the interference signal.

Exchanging the information related to progress of NC in step 1110 may be performed during an initial connection setup procedure of the UE 1101 and the BS 1100 or may be omitted. For example, if the BS 1100 already knows that NC based on nonlinearity information of the interference signal is performed, step 1110 may be omitted.

In step 1120, the BS 1100 transmits first RS-related information and second RS-related information to the UE 1101. The first RS-related information may include RS-related information for a target UE, and the second RS-related information may include information related to an RS for an interference UE. Because the BS 1100 transmits the second RS-related information to the UE 1101, the UE 1101 may compensate for nonlinearity of the interference signal.

In step 1120, the first RS-related information and the second RS-related information may include a type of the RS and a time-frequency resource location at which the RS is transmitted. For example, the type of the first RS or the second RS may be a demodulation RS (DMRS), a sounding RS (SRS), a primary synchronization signal (PSS), a secondary synchronization signal (SSS), a channel state information-RS (CSI-RS), or an RS for NC, and the type of the first RS or the second RS may be transmitted through an index in a format similar to Table 1 below.

TABLE 1

| RS type | DMRS | SRS | PSS | SSS | CSI-RS | . . . |
|---------|------|-----|-----|-----|--------|-------|
| Index | 000 | 001 | 010 | 011 | 100 | . . . |

For example, when the type of the first RS or the second RS is a DMRS, the first RS-related information or the second RS-related information may be information including Index 000, NumLayer, DMRS mapping type, NumCDMGroupswithoutData, DMRSLength, DMRSConfiguration Type, and DMRSAdditionalPosition. As another example, when the type of the first RS or the second RS is an SRS, the first RS-related information or the second RS-related information may be information including Index 001, srs-Bandwidth, srs-HoppinBandwidth, freqDomainPosition, duration, srs-ConfigIndex, and transmissionComb.

The first RS-related information or the second RS-related information may be semi-statically transmitted through a medium access control (MAC) control element (CE) or an RRC message, or may be dynamically transferred to the UE 1101 through DL control information (DCI).

In an example in which the BS 1100 semi-statically transfers the first RS-related information or the second RS-related information to the UE 1101, the BS 1100 may transmit, to the UE 1101, RS-related information for each purpose including a lookup table having rows indicating a transmission location (time and/or frequency resource) of each RS, a transmission period, and a type of the RS. The type of the RS transmitted to the UE 1101 may include, e.g., a PSS, an SSS, a DMRS, a CSI-RS, an SRS, or an RS for the purpose of NC.

In another example in which the BS 1100 semi-statically transfers the first RS-related information and the second RS-related information to the UE 1101, the BS 1100 may transfer, to the UE 1101, information indicating a transmission location (e.g., time and/or frequency resource) of each of the first RS or the second RS, a transmission period, and a type of the RS. The type of the RS transmitted to the UE 1101 may include, e.g., a PSS, an SSS, a DMRS, a CSI-RS, an SRS, or an RS for the purpose of NC.

In an example in which the BS 1100 dynamically transfers the first RS-related information and the second RS-related information to the UE 1101, the BS 1100 may transfer the first RS-related information and the second RS-related information to the UE 1101 according to a determination of the BS 1100 or a request from the UE 1101. For example, the BS 1100 may determine whether additional transmission of the first RS or the second RS is needed based on a type of a transmitted signal and PA specifications. When additional transmission of the first RS or the second RS is needed, the BS 1100 may determine the first RS-related information and the second RS-related information in consideration of additional information of the first RS or the second RS and transmit the same to indicate the additional transmission of the first RS and the second RS.

In step 1130, the BS 1100 transmits, to the UE 1101, the first RS according to the first RS-related information and the second RS according to the second RS-related information as transmitted in step 1120. The first RS may be, e.g., an RS for estimating a channel and/or nonlinearity of the signal that the BS 1100 transmits to a target UE, and the second RS may be, e.g., an RS for estimating a channel and/or nonlinearity of the signal that the BS 1100 transmits to an interference UE.

In connection with step 1130, the BS 1100 may transmit the first RS and the second RS at the same time so that a target UE acquires nonlinearity information of the target signal and nonlinearity information of the interference signal. Information indicating that the first RS and the second RS are transmitted at the same time may be transmitted in step 1120.

In step 1140, the UE 1101 acquires first nonlinearity information and second nonlinearity information. For example, the first nonlinearity information may include information related to nonlinearity of the target signal, and the second nonlinearity information may include information related to nonlinearity of the interference signal.

The UE 1101 may estimate the channel of the DL signal based on the first RS-related information received from the BS 1100 and the first RS, and may acquire nonlinearity information of the target signal based on the estimated channel, the first RS-related information, and the first RS. The acquired nonlinearity information of the target signal may be first nonlinearity information.

Further, the UE 1101 may acquire nonlinearity information of the DL signal (e.g., an interference signal) between the BS 1100 and an interference UE based on the second RS-related information received from the BS 1100 and the second RS. The acquired nonlinearity information of the target signal may be second nonlinearity information.

The UE 1101 may generate or supplement the NC model by the receiving side based on the first nonlinearity information and the second nonlinearity information acquired in step 1140. The process of generating or supplementing the NC model may be performed based on AI, and/or based on a GMP, a memory polynomial (MP), or Volterra series.

In connection with step 1140, the process of acquiring nonlinearity information may be the same as a process of acquiring a coefficient of a nonlinear function, and the coefficient of the nonlinear function may be induced using a received signal and an already known RS sequence. The received signal may be an RS, and the already known RS sequence may include RS-related information.

In step 1150, the BS 1100 transmits a DL signal to the UE 1101. The DL signal may include a data signal and an RS. When the DL signal received by the UE 1101 in step 1150 includes an RS, the process of step 1140 may be performed again based on the received RS.

Although step 1150 is described separately from step 1130, this is done for convenience of description, and step 1150 may be performed before step 1140, and/or steps 1130 and 1150 may be performed in one operation. For example, in step 1130, the BS 1100 may transmit all of the first RS, the second RS, and the DL signal to the UE 1101. The RSs may be transmitted in some resource elements (REs) of one slot, and the DL signal (or DL data) may be transmitted in other REs.

In step 1150, the DL signal that the BS 1100 transmits to the UE 1101 may be a DL signal including nonlinearity. Additionally, the DL signal that the BS 1100 transmits to the UE 1101 may include not only nonlinearity of the target signal but also nonlinearity of the interference signal.

In step 1160, the UE 1101 compensates for nonlinearity of the received DL signal based on the first nonlinearity information and the second nonlinearity information acquired in step 1140. The process of compensating for nonlinearity may include passing through the NC model. The DL signal for which nonlinearity has been compensated based on the first nonlinearity information and the second nonlinearity information may have nonlinearity that has been completely removed or has been reduced. In connection with the NC model, examples of an NC operation and detailed NC operations are described above with reference to FIG. 6.

Figure 12:
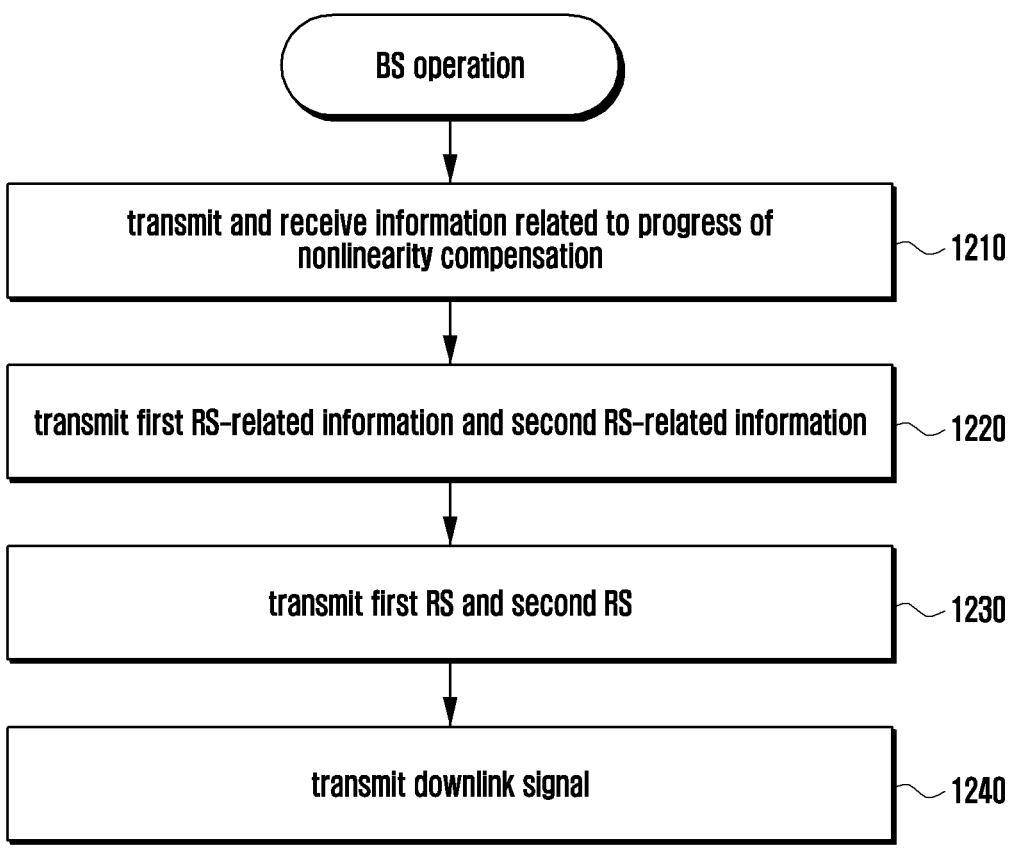
FIG. 12 is a flowchart illustrating BS operations related to compensation for nonlinearity of an interference signal when the BS transmits a DL signal to a UE in a wireless communication system according to an embodiment.

FIG. 12 is a flowchart illustrating BS operations related to compensation for nonlinearity of an interference signal when the BS transmits a DL signal to a UE in a wireless communication system according to an embodiment.

Referring to FIG. 12, the UE to which the BS transmits the DL signal may be a target UE, and the DL signal that the BS transmits to the target UE may be a target signal.

In step 1210, the BS may receive, from the UE, information related to progress of NC. For example, the BS may receive, from the UE, nonlinearity information of the target signal and information on whether to perform NC based on nonlinearity information of the interference signal.

When exchanging the information on whether to perform NC based on the nonlinearity information of the interference signal, the BS may also receive UE capability information. The UE capability information may include information indicating that an NC function based on nonlinearity information of the interference signal can be supported.

In connection with step 1210, the BS may receive a message including UE capability information (e.g., a UE capability response message) from the UE. The BS receiving the UE capability information may identify whether the UE supports the NC function related to the target signal and the interference signal.

Step 1210 may be performed during an initial connection setup procedure of the UE and the BS or may be omitted. For example, if the BS already knows that NC based on nonlinearity information of the interference signal is performed, step 1210 may be omitted.

In step 1220, the BS transmits first RS-related information and second RS-related information to the UE. For example, the first RS-related information may include RS-related information for the target UE, and the second RS-related information may include information related to an RS for the interference UE. The BS transmits the second RS-related information to the UE in order to compensate for nonlinearity of the interference signal.

In connection with step 1220, the first RS-related information and the second RS-related information may include a type of the RS and a time-frequency resource location at which the RS is transmitted. For example, the type of the first RS or the second RS may be one of a DMRS, an SRS, a PSS, an SSS, a CSI-RS, or an RS for NC, and the type of the first RS or the second RS may be transmitted through an index in a format similar to Table 1, as shown above.

For example, when the type of the first RS or the second RS is a DMRS, the first RS-related information or the second RS-related information may be information including Index 000, NumLayer, DMRS mapping type, NumCDMGroupswithoutData, DMRSLength, DMRSConfigurationType, and DMRSAdditionalPosition. As another example, when the type of the first RS or the second RS is an SRS, the first RS-related information or the second RS-related information may be information including Index 001, srs-Bandwidth, srs-HoppinBandwidth, freqDomainPosition, duration, and srs-ConfigIndex, transmissionComb.

The first RS-related information or the second RS-related information may be semi-statically transferred to the UE through a MAC CE or an RRC message, or may be dynamically transferred to the UE through DCI.

In an example in which the BS semi-statically transfers the first RS-related information and the second RS-related information to the UE, the BS may transmit pilot information for each purpose including a lookup table having rows indicating a transmission location (e.g., a time and/or frequency resource) of each pilot, a transmission period, a sequence type (e.g., a DMRS or a CSI-RS), or a power scaling value to the UE. The pilot information for each purpose may further include indicator information (or an indicator) indicating one row in the lookup table.

Further, the BS may transmit information (or an indicator) indicating one row in the lookup table to the UE. The indication information may be transmitted through control information, and the control information may be a control message, control signaling, a MAC-CE, DCI, or an RRC message.

In another example in which the BS semi-statically transfers the first RS-related information and the second RS-related information, the BS may transfer, to the UE, information including a transmission location (e.g., a time and/frequency resource) of each of the first RS or the second RS, a transmission period, purpose, a sequence type, and a power scaling value.

For example, when the BS dynamically transfers the first RS-related information and the second RS-related information to the UE, the BS may transfer the first RS-related information and the second RS-related information to the UE according to a determination of the BS or a request from the UE. For example, the BS may determine whether additional transmission of the first RS or the second RS is needed based on a type of a transmitted signal and PA specifications. When additional transmission of the first RS or the second RS is needed, the BS may determine the first RS-related information and the second RS-related information in consideration of additional information of the first RS or the second RS and transmit the same to indicate the additional transmission of the first RS and the second RS.

In step 1230, the BS transmits, to the UE, the first RS according to the first RS-related information and the second RS according to the second RS-related information, as transmitted in step 1220. For example, the first RS may include an RS for estimating a channel and/or nonlinearity of the signal that the BS transmits to the target UE, and the second RS may include an RS for estimating a channel and/or nonlinearity of the signal that the BS transmits to the interference UE.

In step 1240, the BS transmits a DL signal to the UE. The DL signal may include a data signal and an RS. The DL signal that the BS transmits to the UE may be a DL signal including nonlinearity. Additionally, the DL signal that the BS transmits to the UE may not only include the nonlinearity of the target signal but also nonlinearity of the interference signal.

Although step 1240 is described separately from step 1230, this is done for convenience of description, and steps 1230 and 1240 may be performed in one operation. For example, in step 1230, the BS may transmit all of the first RS, the second RS, and the DL signal to the UE. The RSs may be transmitted in some REs of one slot, and the DL signal (or DL data) may be transmitted in other REs.

Figure 13:
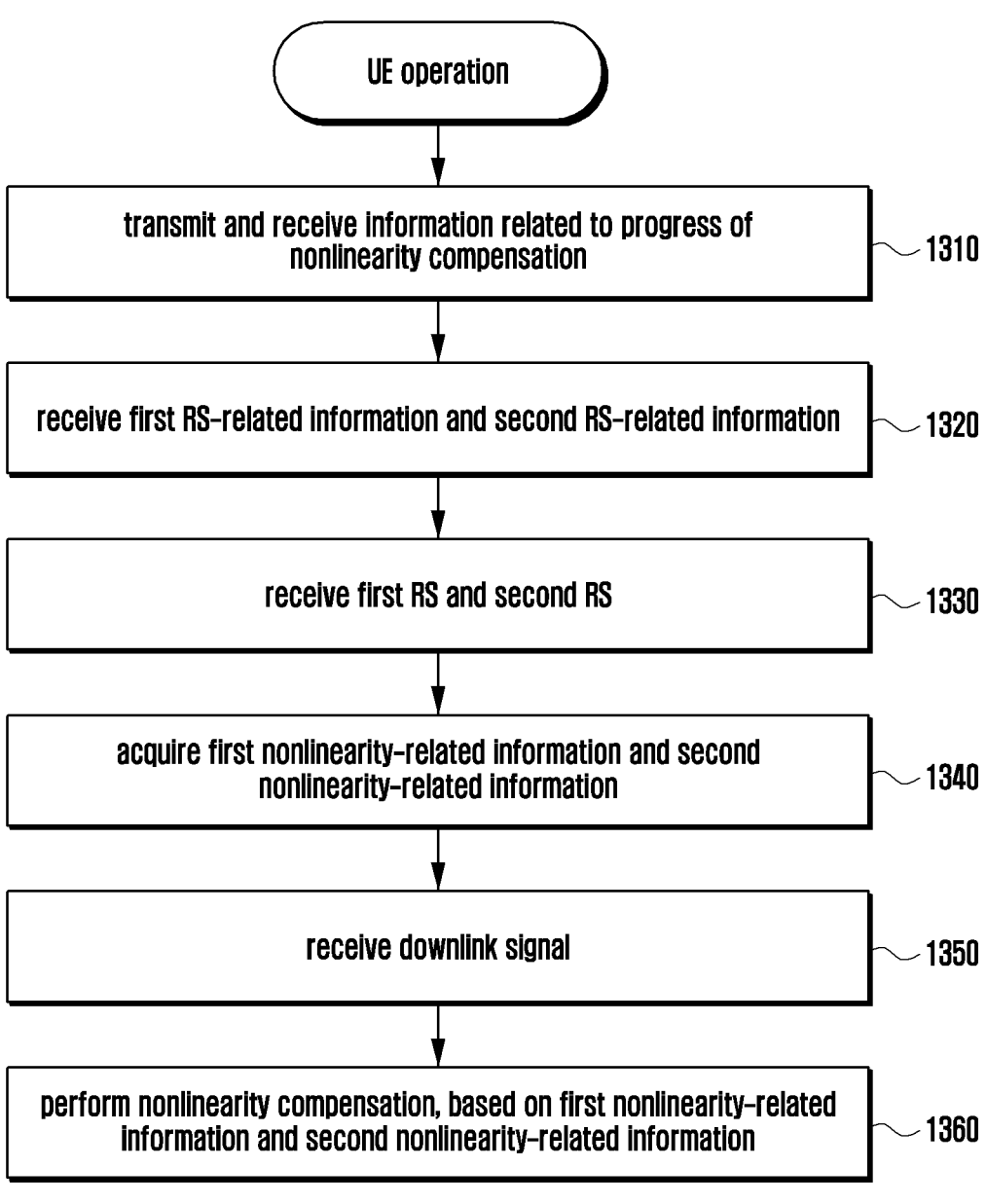
FIG. 13 is a flowchart illustrating UE operations related to compensation for nonlinearity of an interference signal when a BS transmits a DL signal to the UE in a wireless communication system according to an embodiment.

FIG. 13 is a flowchart illustrating UE operations related to compensation for nonlinearity of an interference signal when a BS transmits a DL signal to the UE in a wireless communication system according to an embodiment.

Referring to FIG. 13, the UE receiving the DL signal from the BS may be a target UE, and the DL signal that the target UE receives from the BS may be a target signal.

In step 1310, the UE transmits, to the BS, information related to progress of NC. In connection with step 1310, the UE may transmit UE capability information. The UE capability information may include information indicating that an NC function based on nonlinearity information of the interference signal can be supported.

Step 1310 may be performed during an initial connection setup procedure of the UE and the BS or may be omitted. For example, if the BS already knows that NC based on nonlinearity information of the interference signal is performed, step 1310 may be omitted.

In step 1320, the UE receives first RS-related information and second RS-related information from the BS. For example, the first RS-related information may include information related to am RS for the target UE, and the second RS-related information may include information related to an RS for the interference UE.

In connection with step 1320, the first RS-related information and the second RS-related information may include a type of the RS and a time-frequency resource location at which the RS is transmitted. For example, the type of the first RS or the second RS may be one of a DMRS, an SRS, a PSS, an SSS, a CSI-RS, or an RS for NC, and the type of the first RS or the second RS may be transmitted through an index in a format similar to Table 1, as shown above.

For example, when the type of the first RS or the second RS is a DMRS, the first RS-related information or the second RS-related information may be information including Index 000, NumLayer, DMRS mapping type, NumCDMGroupswithoutData, DMRSLength, DMRSConfigurationType, and DMRSAdditionalPosition. As another example, when the type of the first RS or the second RS is an SRS, the first RS-related information or the second RS-related information may be information including Index 001, srs-Bandwidth, srs-HoppinBandwidth, freqDomainPosition, duration, srs-ConfigIndex, and transmissionComb.

The UE may receive the first RS-related information and the second RS-related information through a MAC CE, an RRC message, or DCI.

In step 1330, the UE receives, from the BS, the first RS according to the first RS-related information and the second RS according to the second RS-related information, as received in step 1320. The first RS may include an RS for estimating a channel and/or nonlinearity of the signal that the target UE receives from the BS, and the second RS may include an RS for estimating a channel and/or nonlinearity of the signal that the interference UE receives from the BS.

In step 1340, the UE acquires first nonlinearity information and second nonlinearity information. For example, the first nonlinearity information may include information related to nonlinearity of the target signal, and the second nonlinearity information may include information related to nonlinearity of the interference signal.

The UE may estimate a channel of a "DL signal between the BS and the UE (target UE) based on the first RS-related information received from the BS and the first RS, and acquire nonlinearity information of the target signal based on the estimated channel, the first RS-related information, and the first RS. The acquired nonlinearity information of the target signal may be first nonlinearity information.

Further, the UE may acquire nonlinearity information of the DL signal (e.g., an interference signal) between the BS and the interference UE based on the second RS-related information received from the BS and the second RS. The acquired nonlinearity information of the target signal may be second nonlinearity information.

The UE may generate or supplement the NC model based on the first nonlinearity information and the second nonlinearity information acquired in step 1340. The process of generating or supplementing the NC model may be performed based on AI or a GMP.

In step 1350, the UE receives the DL signal from the BS. The DL signal may include a data signal and/or an RS. When the DL signal received by the UE in step 1350 includes an RS, the UE may supplement the NC model based on the received DL signal.

In step 1350, the DL signal received by the UE may be a DL signal including nonlinearity. Additionally, the DL signal that the UE receives from the BS may not only include nonlinearity of the target signal but also nonlinearity of the interference signal.

Although step 1350 is illustrated and described separately from step 1330, this is done for convenience of description, and step 1350 may be performed before step 1340, and/or steps 1330 and 1350 may be performed in one operation For example, in step 1330, the UE may receive all of the first RS, the second RS, and the DL signal from the BS. The RSs may be received through some REs of one slot, and the DL signal (or DL data) may be received through other REs.

In step 1360, the UE compensates for nonlinearity of the received DL signal based on the first nonlinearity information and the second nonlinearity information acquired in step 1340. The process of compensating for nonlinearity may include passing through the NC model. The DL signal for which nonlinearity has been compensated based on the first nonlinearity information and the second nonlinearity information may have nonlinearity that has been completely removed or has been reduced. In connection with the NC model, examples of NC operations and detailed NC operations are described above with reference to FIG. 6.

Figure 14:
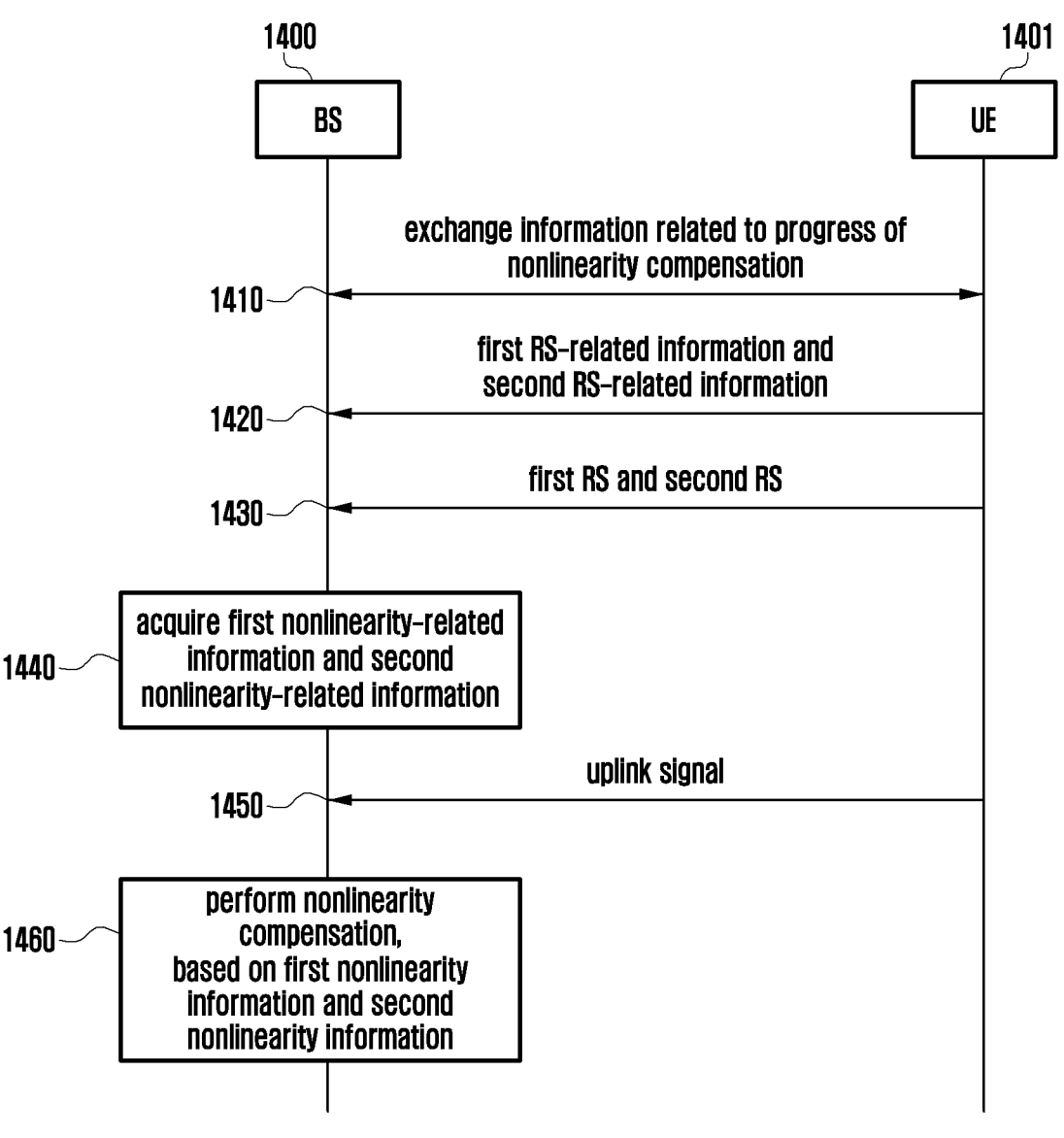
FIG. 14 is a signal flow diagram illustrating nonlinearity of an interference signal being compensated for while a UE transmits a UL signal to a BS in a wireless communication system according to an embodiment.

FIG. 14 is a signal flow diagram illustrating nonlinearity of an interference signal being compensated for while a UE transmits a UL signal to a BS in a wireless communication system according to an embodiment.

Referring to FIG. 14, the UE 1401 transmitting the UL signal to the BS 1400 may be a target UE in that the UE 1401 is a target of which performance of a received signal is inspected. The UL signal that the target UE transmits to the BS 1400 may be a target signal.

Referring to FIG. 14, in step 1410, the UE 1401 and the BS 1400 exchange NC-related information. For example, the UE 1401 and the BS 1400 may exchange nonlinearity information of the target signal and information on whether to perform NC based on nonlinearity information of the interference signal.

The UE 1401 and the BS 1400 may exchange UE capability information while exchanging the information on whether to perform NC based on nonlinearity information of the interference signal. For example, the UE capability information may include nonlinearity information of the target signal as well as information on whether to support an NC function based on nonlinearity information of the interference signal.

The BS 1400 may transmit, to the UE 1401, a message inquiring about UE capability information (e.g., a UE capability request message). In response to the inquiry message, the UE 1401 may transmit a message including its own capability information (e.g., a UE capability response message) to the BS. The UE capability request message and the UE capability response message may be RRC messages. The BS 1400 receiving the UE capability information may identify whether the UE 1401 supports the NC function related to the target signal and the interference signal.

Step 1410 may be performed during an initial connection setup procedure of the UE 1401 and the BS 1400 or may be omitted. For example, if the BS 1400 already knows that NC based on nonlinearity information of the interference signal is performed, step 1410 may be omitted.

In step 1420, the UE 1401 transmits first RS-related information and second RS-related information to the BS 1400. For example, the first RS-related information may include information related to an RS for the target UE, and the second RS-related information may include information related to an RS for the interference UE. The UE 1401 transmits the second RS-related information to the BS in order to allow the BS 1400 to compensate for nonlinearity of the interference signal.

In connection with step 1420, the first RS-related information and the second RS-related information may include a type of the RS and a time-frequency resource location at which the RS is transmitted. For example, the type of the first RS or the second RS may be one of a DMRS, an SRS, a PSS, an SSS, a CSI-RS, or an RS for NC, and the type of the first RS or the second RS may be transmitted through an index in a format similar to Table 1, as shown above For example, when the type of the first RS or the second RS is a DMRS, the first RS-related information or the second RS-related information may be information including Index 000, NumLayer, DMRS mapping type, NumCDMGroupswithoutData, DMRSLength, DMRSConfigurationType, and DMRSAdditionalPosition. As another example, when the type of the first RS or the second RS is the SRS, the first RS-related information or the second RS-related information may be information including Index 001, srs-Bandwidth, srs-HoppinBandwidth, freqDomainPosition, duration, srs-ConfigIndex, and transmissionComb.

In step 1430, the UE 1401 transmits, to the BS 1400, the first RS according to the first RS-related information and the second RS according to the second RS-related information, as transmitted in step 1420. For example, the first RS may include an RS for estimating a channel and/or nonlinearity of the signal that the target UE transmits to the BS 1400, and the second RS may include an RS for estimating a channel and/or nonlinearity of the signal that the interference UE transmits to the BS 1400.

In step 1440, the BS 1400 acquires first nonlinearity information and second nonlinearity information. For example, the first nonlinearity information may include information related to nonlinearity of the target signal, and the second nonlinearity information may include information related to nonlinearity of the interference signal.

The BS 1400 may estimate the channel of the UL signal based on the first RS-related information received from the UE 1401 and the first RS and acquire nonlinearity information of the target signal based on the estimated channel, the first RS-related information, and the first RS. The acquired nonlinearity information of the target signal may be first nonlinearity information.

Further, the BS 1400 may acquire nonlinearity information of the DL signal (e.g., an interference signal) between the BS 1400 and the interference UE based on the second RS-related information received from the UE 1401 and the second RS. The acquired nonlinearity information of the target signal may be second nonlinearity information.

The BS 1400 may generate or supplement the NC model by the receiving side based on the first nonlinearity information and the second nonlinearity information acquired in step 1440. The process of generating or supplementing the NC model may be performed based on AI and/or a GMP.

In step 1450, the UE 1401 transmits the UL signal to the BS 1400. The UL signal may include a data signal and/or an RS. When the UL signal received by the BS 1400 in step 1450 includes an RS, the NC model may be supplemented based on the received RS.

Although step 1450 is described separately from step 1430, this is done for convenience of description, and step 150 may be performed before step 1440, and/or steps 1430 and 1450 may be performed as one operation. For example, in step 1430, the UE 1401 may transmit all of the first RS, the second RS, and the UL signal to the BS 1400. The RSs may be transmitted in some REs of one slot, and the UL signal (or UL data) may be transmitted in other REs.

In connection with step 1450, the UL signal that the UE 1401 transmits to the BS 1400 may be a UL signal including nonlinearity. The UL signal that the UE 1401 transmits to the BS 1400 may include nonlinearity of the target signal as well as nonlinearity of the interference signal.

In step 1460, the BS 1400 compensates for nonlinearity of the received UL signal based on the first nonlinearity information and the second nonlinearity information acquired in step 1440. The process of compensating for nonlinearity may include passing through the NC model. The UL signal for which nonlinearity has been compensated based on the first nonlinearity information and the second nonlinearity information may have nonlinearity that has been completely removed or has been reduced. In connection with the NC model, examples of NC operations and detailed NC operations are described above with reference to FIG. 6.

Figure 15:
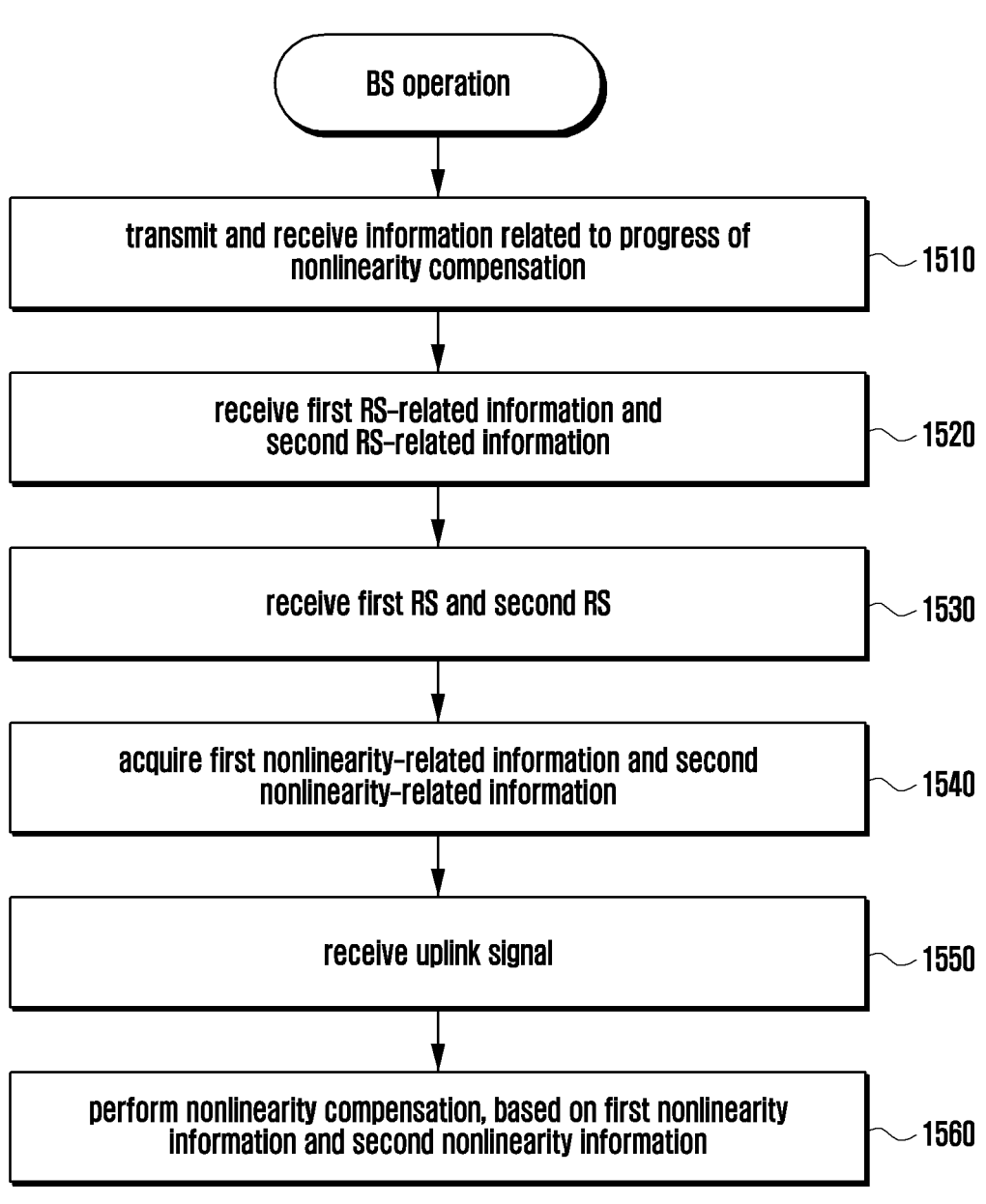
FIG. 15 is a flowchart illustrating BS operations in which nonlinearity of an interference signal is compensated for when a UE transmits a UL signal to the BS in a wireless communication system according to an embodiment.

FIG. 15 is a flowchart illustrating BS operations in which nonlinearity of an interference signal is compensated for when a UE transmits a UL signal to the BS in a wireless communication signal according to an embodiment.

Referring to FIG. 15, the BS receives NC-related information from the UE in step 1510. For example, the BS may receive nonlinearity information of a target signal and information on whether to perform NC based on nonlinearity information of the interference signal.

While exchanging the information on whether to perform NC based on the nonlinearity information of the interference signal, the BS may receive UE capability information. For example, the UE capability information may include nonlinearity information of the target signal as well as information on whether to support an NC function based on nonlinearity information of the interference signal.

The BS may receive a UE capability response message from the UE. The UE capability response message may be an RRC message. The BS receiving the UE capability information may identify whether the UE supports an NC function related to the target signal and the interference signal.

Step 1510 may be performed during an initial connection setup procedure of the UE and the BS or may be omitted. For example, if the BS already knows that NC based on nonlinearity information of the interference signal is performed, step 1510 may be omitted.

In step 1520, the BS receives first RS-related information and second RS-related information from the UE. For example, the first RS-related information may include information related to an RS for the target UE, and the second RS-related information may include information related to an RS for the interference UE.

In connection with step 1520, the first RS-related information and the second RS-related information may include a type of the RS and a time-frequency resource location at which the RS is transmitted. For example, the type of the first RS or the second RS may be one of a DMRS, an SRS, a PSS, an SSS, a CSI-RS, or an RS for NC, and the type of the first RS or the second RS may be transmitted through an index in a format similar to Table 1, as shown above.

For example, when the type of the first RS or the second RS is a DMRS, the first RS-related information or the second RS-related information may be information including Index 000, NumLayer, DMRS mapping type, NumCDMGroupswithoutData, DMRSLength, DMRSConfigurationType, and DMRSAdditionalPosition. As another example, when the type of the first RS or the second RS is an SRS, the first RS-related information or the second RS-related information may include Index 001, srs-Bandwidth, srs-HoppinBandwidth, freqDomainPosition, duration, srs-ConfigIndex, and transmissionComb.

In step 1530, the BS receives, from the UE, the first RS according to the first RS-related information and the second RS according to the second RS-related information, as acquired in step 1520. For example, the first RS may be for estimating a channel and/or nonlinearity of the signal that the BS receives from the target UE, and the second RS may be for estimating a channel and/or nonlinearity of the signal that the BS receives from the interference UE In step 1540, the BS acquires first nonlinearity information and second nonlinearity information. For example, the first nonlinearity information may include information related to nonlinearity of the target signal, and the second nonlinearity information may include information related to nonlinearity of the interference signal.

The BS may estimate the channel of the UL signal based on the first RS-related information received from the UE and the first RS and acquire nonlinearity information of the target signal based on the estimated channel, the first RS-related information, and the first RS. The acquired nonlinearity information of the target signal may be first nonlinearity information.

Further, the BS may acquire nonlinearity information of the DL signal (e.g., an interference signal) between the BS and the interference UE based on the second RS-related information received from the UE and the second RS. The acquired nonlinearity information of the target signal may be second nonlinearity information.

The BS may generate or supplement the NC model by the receiving side based on the first nonlinearity information and the second nonlinearity information acquired in step 1540. The process of generating or supplementing the NC model may be performed based on AI and/or a GMP.

In step 1550, the BS receives the UL signal from the UE. The UL signal may include a data signal and/or an RS. When the UL signal received by the BS in step 1550 includes an RS, the NC model may be supplemented based on the received RS.

Although step 1550 is illustrated and described separately from step 1530, this is done for convenience of description, and step 1550 may be performed before step 1540, and/or steps 1530 and 1550 may be performed in one operation. For example, in step 1530, the BS may receive all of the first RS, the second RS, and the UL signal from the UE. The RSs may be received in some REs of one slot, and the UL signal (or UL data) may be received in other REs.

In connection with step 1550, the UL signal that the BS receives from the UE may be a UL signal including nonlinearity. The UL signal that the BS receives from the UE may include nonlinearity of the target signal as well as nonlinearity of the interference signal.

In step 1560, the BS compensates for nonlinearity of the received UL signal based on the first nonlinearity information and the second nonlinearity information acquired in step 1540. The process of compensating for nonlinearity may include passing through the NC model. The UL signal for which nonlinearity has been compensated based on the first nonlinearity information and the second nonlinearity information may have nonlinearity that has been completely removed or has been reduced. In connection with the NC model, examples of the NC operations and detailed NC operations are described above with reference to FIG. 6.

Figure 16:
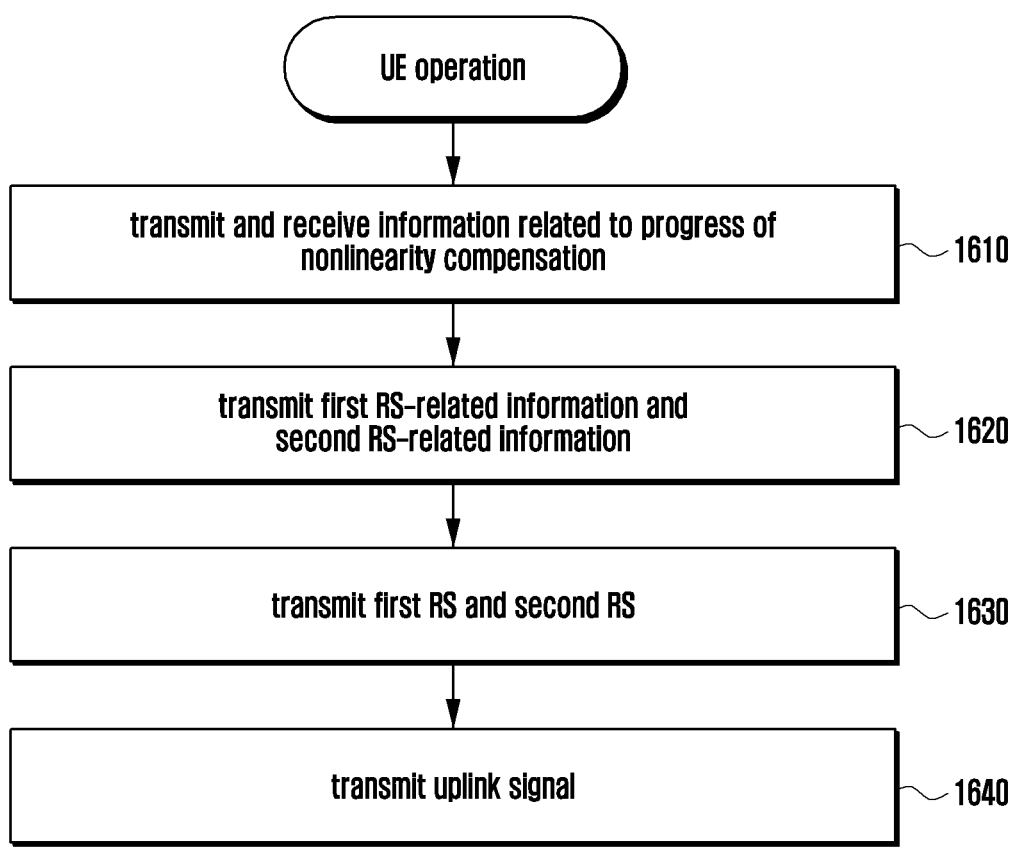
FIG. 16 is a flowchart illustrating UE operations in which nonlinearity of an interference signal is compensated for when the UE transmits a UL signal to a BS in a wireless communication system according to an embodiment.

FIG. 16 is a flowchart illustrating UE operations in which nonlinearity of an interference signal is compensated for when the UE transmits a UL signal to a BS in a wireless communication system according to an embodiment.

In FIG. 16, the UE transmitting the UL signal to the BS may be a target UE in that the UE is a target of which performance of the transmitted signal is inspected. The UL signal that the target UE transmits to the BS may be a target signal.

Referring to FIG. 16, in step 1610, the UE receives NC-related information from the BS. For example, the UE may receive, from the BS, nonlinearity information of a target signal and information on whether to perform NC based on nonlinearity information of the interference signal.

Additionally, in step 1610, the UE transmits information related to progress of NC. In connection with step 1610, the UE may transmit UE capability information. The UE capability information may include information indicating that an NC function based on nonlinearity information of the interference signal can be supported.

Step 1610 may be performed during an initial connection setup procedure of the UE and the BS or may be omitted. For example, if the BS already knows that NC based on nonlinearity information of the interference signal is performed, step 1610 may be omitted.

In step 1620, the UE transmits first RS-related information and second RS-related information to the BS. For example, the first RS-related information may include information related to an RS for the target UE, and the second RS-related information may include information related to an RS for the interference UE. The UE transmits the second RS-related information to the BS in order to allow the BS to compensate for nonlinearity of the interference signal.

In connection with step 1620, the first RS-related information and the second RS-related information may include a type of the RS and a time-frequency resource location at which the RS is transmitted. For example, the type of the first RS or the second RS may be one of a DMRS, an SRS, a PSS, an SSS, a CSI-RS, or an RS for NC, and the type of the first RS or the second RS may be transmitted through an index in a format similar to Table 1, as shown above.

For example, when the type of the first RS or the second RS is a DMRS, the first RS-related information or the second RS-related information may include Index 000, NumLayer, DMRS mapping type, NumCDMGroupswith-outData, DMRSLength, DMRSConfigurationType, and DMRSAdditionalPosition. As another example, when the type of the first RS or the second RS is an SRS, the first RS-related information or the second RS-related information may include Index 001, srs-Bandwidth, srs-Hoppin-Bandwidth, freqDomainPosition, duration, srs-ConfigIndex, and transmissionComb.

In step 1630, the UE transmits, to the BS, the first RS according to the first RS-related information and the second RS according to the second RS-related information, as transmitted in step 1620. For example, the first RS may be for estimating a channel and/or nonlinearity of the signal that the BS transmits to the target UE, and the second RS may be for estimating a channel and/or nonlinearity of the signal that the BS transmits to the interference UE.

In step 1640, the UE transmits a UL signal to the BS. The UL signal may include a data signal and/or an RS. The UL signal that the UE transmits to the BS may be a UL signal including nonlinearity. The UL signal that the UE transmits to the BS may include nonlinearity of the target signal as well as nonlinearity of the interference signal.

Although step 1640 is illustrated and described separately from step 1630, this is done for convenience of description, and steps 1630 and 1640 may be performed in one operation For example, in step 1630, the UE may transmit all of the first RS, the second RS, and the UL signal to the BS. The RSs may be transmitted in some REs of one slot, and the UL signal (or UL data) may be transmitted in other REs.

FIG. 17 illustrates NC performance based on nonlinearity information of a target signal and an interference signal in a wireless communication system according to an embodiment. More specifically, FIG. 17 is based on an environment in which there is nonlinear interference from a signal transmitted through adjacent resource in a frequency domain due to nonlinearity of the signal.

Referring to FIG. 17, the graph shows signals having specific properties on the x axis (i.e., a signal to noise ratio (SNR)) and the y axis (i.e., a bit error rate (BER)).

Reference numeral 1700 may be a signal which does not include nonlinearity, and reference numeral 1710 indicates a signal that includes nonlinearity. Reference numeral 1720 indicates a signal having performed NC in consideration of nonlinearity information of the target signal, and reference numeral 1730 indicates a signal having performed NC in consideration of both nonlinearity information of the target signal and nonlinearity information of the interference signal.

The signal 1700, which does not include nonlinearity, may be a signal that has not passed through a nonlinear element corresponding to a PA, and the signal 1710, which includes nonlinearity, may be a signal that has passed through the nonlinear element corresponding to the PA. In comparing signals 1700 and 1710, the signal 1710, which includes nonlinearity, has a higher SNR than the signal 1700, which does not include nonlinearity. Specifically, when the BER is $10^{-8}$, the SNR of the signal 1710, which includes nonlinearity, is about 23 dB and the SNR of the signal 1700, which does not include nonlinearity, is about 18.5 dB. Accordingly, when a signal includes nonlinearity, the SNR thereof is higher than if the signal does not include nonlinearity.

In comparing signals 1720 and 1730, when NC is performed in consideration of both the nonlinearity information of the target signal and the nonlinearity information of the interference signal as indicated by signal 1730, additional SNR gain is obtained than for the signal 1720 in which NC is performed in consideration of only the nonlinearity information of the target signal. Specifically, when the BER is $10^{-3}$, the signal 1730 has an SNR gain of about 0.8 dB compared to the signal 1720.

Considering the technical description in connection with FIG. 17, when NC is performed in consideration of the nonlinearity information of the target signal as well as the nonlinearity information of the interference signal, noise of the signal can be reduced, thereby improving communication.

FIG. 18 illustrates a UE according to an embodiment.

Referring to FIG. 18, a UE 1800 includes a transceiver 1801, a controller (or processor) 1802, and a storage unit (or memory) 1803. Alternatively, the UE 1800 may include more or fewer element than the above-described elements. Further, the transceiver 1801, the controller 1802, and the storage unit 1803 may be implemented in a single-chip form.

The transceiver 1801 may be implemented as a transmitter and a receiver. The transceiver 1801 may transmit and receive signals to and from the BS. The signal may include control information and data. To this end, the transceiver 1801 may include an RF transmitter for up-converting and amplifying a frequency of a transmitted signal and an RF receiver for low-noise amplifying a received signal and down-converting the frequency. Further, the transceiver 1801 may receive a signal through a radio channel, output the signal to the controller 1802, and transmit the signal output from the controller 1802 through the radio channel.

The controller 1802 may control a series of processes in which the UE 1800 can operate according to the embodiments of the disclosure. To this end, the controller 1802 may include at least one processor. For example, the controller 1802 may include a communication processor (CP) that performs a control for communication, and an application processor (AP) that controls a higher layer such as an application program.

The storage unit 1803 may store control information or data included in a signal acquired by the UE 1800 and may have an area to store data required for the control of the controller 1802 or data generated in case that the controller 1802 performs control.

Further, the UE 1800 may include an AI device capable of performing at least some of AI processing. The AI device may include an AI processor, a memory, and/or a communication unit.

For example, the controller 1802 may operate as the AI processor or may perform at least some functions of the AI processor. The AI processor may train a neural network through programs stored in the memory. The neural network may be designed to imitate a human brain structure on a computer and may include a plurality of network nodes which simulate neurons of a human neural network and have weighted values. The plurality of network modes may exchange data according to the connection relation to simulate the synaptic activity of neurons exchanging signals through synapses. The neural network may include a deep learning model developed from the neural network model. In the deep learning model, the plurality of network nodes is located on layers and may exchange data according to the convolution connection relation.

The AI processor may include a data learning unit that trains the neural network for data classification/recognition. The data learning unit may classify data to be used for learning and acquire data to be learned. The data learning unit may train the deep learning model by applying the acquired learning data to the deep learning model. For example, the deep learning model may be trained through supervised learning or unsupervised learning. Further, the data learning unit may train the deep learning model through reinforcement learning using feedback indicating whether the result of situation judgment according to learning is correct. The deep learning model can be trained on the basis of data of the input layer and the output layer.

The data learning unit may be manufactured in the form of at least one hardware chip and installed in the AI device. For example, the data learning unit may be manufactured in the form of a dedicated hardware chip for AI or manufactured as a portion of a universal central processing unit (CPU) or a graphics processor (GPU) and installed in the AI device. Further, the data learning unit may be implemented as a software module. In case that the learning unit is implemented as the software module (or a program module including instructions), the software module may be stored in non-transitory computer readable-media. In this case, at least one software module may be provided by an operating system (OS) or an application.

For example, the storage unit 1803 may include a memory of the AI device. The memory may store various programs and data required for the operation of the AI device. The memory may be accessed by the AI processor, and data may be read/recorded/modified/deleted/updated by the AI processor. For example, the data learning unit may store the trained model associated with the input/output relation information of the PA in the memory.

For example, a communication unit of the AI device may be included in the transceiver 1801.

FIG. 19 illustrates a BS according to an embodiment.

Referring to FIG. 19, a BS 1900 includes a transceiver 1901, a controller (or processor) 1902, and a storage unit (or memory) 1903. Alternatively, the BS 1900 may include more or fewer elements than the above-described elements. Further, the transceiver 1901, the controller 1902, and the storage unit 1903 may be implemented in a single-chip form.

The transceiver 1901 may be implemented as a transmitter and a receiver. The transceiver 1901 may transmit and receive signals to and from the UE. The signal may include control information and data. To this end, the transceiver 1901 may include an RF transmitter for up-converting and amplifying a frequency of a transmitted signal and an RF receiver for low-noise amplifying a received signal and down-converting the frequency. Further, the transceiver 1901 may receive a signal through a radio channel, output the signal to the controller 1902, and transmit the signal output from the controller 1902 through the radio channel.

The controller 1902 may control a series of processes to operate the BS 1900 according to the embodiment of the disclosure. To this end, the controller 1902 may include at least one processor. For example, the controller 1902 may include a CP performing the control for communication and an AP controlling a higher layer such as an application program.

The storage unit 1903 may store control information and data determined by the BS 1900 or information and data received from the UE and may have an area to store data required for the control of the controller 1902 and data generated in case that the controller 1902 performs control.

Further, the BS 1900 may include an AI device capable of performing at least some of AI processing. The AI device may include an AI processor, a memory, and/or a communication unit.

For example, the controller 1902 may operate as the AI processor or may perform at least some functions of the AI processor. The AI processor may train a neural network through programs stored in the memory. The neural network may be designed to imitate a human brain structure on a computer and may include a plurality of network nodes which simulate neurons of a human neural network and have weighted values. The plurality of network modes may exchange data according to the connection relation to simulate the synaptic activity of neurons exchanging signals through synapses. The neural network may include a deep learning model developed from the neural network model. In the deep learning model, the plurality of network nodes is located on layers and may exchange data according to the convolution connection relation.

The AI processor may include a data learning unit that trains the neural network for data classification/recognition. The data learning unit may classify data to be used for training and acquire data for training. The data learning unit may train the deep learning model by applying the acquired learning data to the deep learning model. For example, the deep learning model may be trained through supervised learning or unsupervised learning. Further, the data learning unit may train the deep learning model through reinforcement learning using feedback indicating whether the result of situation judgment according to learning is correct. For example, the data learning unit may classify the received pilot part into input layer data, and may reflect a size scaling factor in an already pilot and classify the pilot into output layer data. The deep learning model can be trained on the basis of data of the input layer and the output layer. Further, it is possible to make an inference from the data part of the received signal as the input layer on the basis of the trained model.

The data learning unit may be manufactured in the form of at least one hardware chip and installed in the AI device. For example, the data learning unit may be manufactured in the form of a dedicated hardware chip for AI or manufactured as a portion of a universal CPU or a GPU and installed in the AI device. Further, the data learning unit may be implemented as a software module. In case that the data learning unit is implemented as the software module (or a program module including instructions), the software module may be stored non-transitory computer-readable media. In this case, at least one software module may be provided by an OS or an application.

The storage unit 1903 may include a memory of the AI device. The memory may store various programs and data required for the operation of the AI device. The memory may be accessed by the AI processor, and data may be read/recorded/modified/deleted/updated by the AI processor. For example, the data learning unit may store the trained model associated with the input/output relation information of the PA in the memory.

For example, a communication unit of the AI device may be included in the transceiver 1901.

In the methods described in the disclosure, some or all of the contents of each embodiment may be implemented in combination without departing from the essential spirit and scope of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented.

Furthermore, although embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants based on the technical idea of the disclosure may be implemented.

In accordance with embodiments described above, the disclosure has an effect of improving performance of NC and increasing data reception performance by operating RSs and acquiring nonlinearity information of an interference signal generated in a frequency domain.

While this disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a user equipment (UE) in a wireless communication system, the method comprising:
   receiving first reference signal (RS)-related information for the UE, and second RS-related information for an interference UE that is causing nonlinearity interference to the UE;
   receiving a first RS based on the first RS-related information and a second RS based on the second RS-related information;
   obtaining first nonlinearity information for nonlinearity of a first signal that a base station (BS) transmits to the UE and second nonlinearity information for nonlinearity of a second signal that the BS transmits to the interference UE, based on the first RS and the second RS; and
   performing nonlinearity compensation (NC) for a downlink signal received from the BS, based on the first nonlinearity information and the second nonlinearity information.

2. The method of claim 1, wherein the second RS-related information includes information indicating a type of the second RS and a location of time or frequency resources to transmit the second RS, and
   wherein the first RS-related information includes information indicating a type of the first RS and a location of time or frequency resources to transmit the first RS.

3. The method of claim 1, wherein, in case that the type of the second RS is demodulation RS (DMRS), the second RS-related information includes at least one of an index value of the DMRS, NumLayer, DMRS mapping type, NumCDMGroupswithoutData, DMRSLength, DMRSConfigurationType, or DMRSAdditionalPosition, and
   wherein, in case that the type of the second RS is a sounding RS (SRS), the second RS-related information includes at least one of an index value of the SRS, srs-Bandwidth, srs-HoppingBandwidth, freqDomainPosition, duration, srs-ConfigIndex, or transmissionComb.

4. The method of claim 2, wherein the information indicating the type of the second RS indicates at least one type of a demodulation RS (DMRS), a sounding RS (SRS), a primary synchronization signal (PSS), a secondary synchronization signal (SSS), a channel state information-RS (CSI-RS), or an RS for NC, and
   wherein the information indicating the type of the first RS indicates at least one type of a DMRS, an SRS, a PSS, an SSS, a CSI-RS, or an RS for NC.

5. The method of claim 2, wherein the type of the second RS or the type of the first RS is determined based on an index value.

6. A method performed by a base station (BS) in a wireless communication system, the method comprising:
   receiving first reference signal (RS)-related information for a user equipment (UE) and second RS-related information for an interference UE that is causing nonlinearity interference to the UE;
   receiving a first RS based on the first RS-related information and a second RS based on the second RS-related information;
   obtaining first nonlinearity information for nonlinearity of a first signal transmitted and received between the BS and the UE and second nonlinearity information for nonlinearity of a second signal transmitted and received between the BS and the interference UE, based on the first RS and the second RS; and performing nonlinearity compensation (NC) for an uplink signal received from the UE, based on the first nonlinearity information and the second nonlinearity information.

7. The method of claim 6, wherein the second RS-related information includes information indicating a type of the second RS and a location of time or frequency resources to transmit the second RS, and wherein the first RS-related information indicates a type of the first RS and a location of time or frequency resources to transmit the first RS.

8. The method of claim 6, wherein, in case that the type of the second RS is a demodulation RS (DMRS), the second RS-related information includes at least one of an index value of the DMRS, NumLayer, DMRS mapping type, NumCDMGroupswithoutData, DMRSLength, DMRSConfigurationType, or DMRSAdditionalPosition, and wherein, in case that the type of the second RS is a sounding RS (SRS), the second RS-related information includes at least one of an index value of the SRS, srs-Bandwidth, srs-HoppingBandwidth, freqDomainPosition, duration, srs-ConfigIndex, or transmissionComb.

9. The method of claim 7, wherein the information indicating the type of the second RS indicates at least one type of a demodulation RS (DMRS), a sounding RS (SRS), a primary synchronization signal (PSS), a secondary synchronization signal (SSS), a channel state information-RS (CSI-RS), or an RS for NC, and wherein the information indicating the type of the first RS indicates at least one type of a DMRS, an SRS, a PSS, an SSS, a CSI-RS, or an RS for NC.

10. The method of claim 7, wherein the type of the second RS or the type of the first RS is determined based on an index value.

11. A user equipment (UE) in a wireless communication system, the UE comprising:

a transceiver; and a processor, wherein the processor is configured to:

receive first reference signal (RS)-related information for the UE and second RS-related information for an interference UE that is causing nonlinearity interference to the UE, receive a first RS based on the first RS-related information and a second RS based on the second RS-related information, obtain first nonlinearity information for nonlinearity of a first signal that a base station (BS) transmits to the UE and second nonlinearity information for nonlinearity of a second signal that the BS transmits to the interference UE, based on the first RS and the second RS, and perform nonlinearity compensation (NC) for a downlink signal received from the BS, based on the first nonlinearity information and the second nonlinearity information.

12. The UE of claim 11, wherein the second RS-related information includes information indicating a type of the second RS and a location of time or frequency resources to transmit the second RS, and wherein the first RS-related information includes information indicating a type of the first RS and a location of time or frequency resources to transmit the first RS.

13. The UE of claim 11, wherein, in case that the type of the second RS is a demodulation RS (DMRS), the second RS-related information includes at least one of an index value of the DMRS, NumLayer, DMRS mapping type, NumCDMGroupswithoutData, DMRSLength, DMRSConfigurationType, or DMRSAdditionalPosition, and wherein, in case that the type of the second RS is a sounding RS (SRS), the second RS-related information includes at least one of an index value of the SRS, srs-Bandwidth, srs-HoppingBandwidth, freqDomainPosition, duration, srs-ConfigIndex, or transmissionComb.

14. The UE of claim 12, wherein the information indicating the type of the second RS indicates at least one type of a demodulation RS (DMRS), a sounding RS (SRS), a primary synchronization signal (PSS), a secondary synchronization signal (SSS), a channel state information-RS (CSI-RS), or an RS for NC, and wherein the information indicating the type of the first RS indicates at least one type of a DMRS, an SRS, a PSS, an SSS, a CSI-RS, and an RS for NC.

15. The UE of claim 12, wherein the type of the second RS or the type of the first RS is determined based on an index value.

16. A base station (BS) in a wireless communication system, the BS comprising:

a transceiver; and a processor, wherein the processor is configured to:

receive first reference signal (RS)-related information for a user equipment (UE) and second RS-related information for an interference UE that is causing nonlinearity interference to the UE, receive a first RS based on the first RS-related information and a second RS based on the second RS-related information, obtain first nonlinearity information for nonlinearity of a first signal transmitted and received between the BS and the UE and second nonlinearity information for nonlinearity of a second signal transmitted and received between the BS and the interference UE, based on the first RS and the second RS, and perform nonlinearity compensation (NC) for an uplink signal received from the UE, based on the first nonlinearity information and the second nonlinearity information.

17. The BS of claim 16, wherein the second RS-related information includes information indicating a type of the second RS and a location of time or frequency resources to transmit the second RS, and wherein the first RS-related information includes information indicating a type of the first RS and a location of time or frequency resources to transmit the first RS.

18. The BS of claim 16, wherein, in case that the type of the second RS is a demodulation RS (DMRS), the second RS-related information includes at least one of an index value of the DMRS, NumLayer, DMRS mapping type, NumCDMGroupswithoutData, DMRSLength, DMRSConfigurationType, or DMRSAdditionalPosition, and wherein, in case that the type of the second RS is a sounding RS (SRS), the second RS-related information comprises at least one of an index value of the SRS, srs-Bandwidth, srs-HoppingBandwidth, freqDomainPosition, duration, srs-ConfigIndex, or transmissionComb.

19. The BS of claim 17, wherein the information indicating the type of the second RS indicates at least one type of a demodulation RS (DMRS), a sounding RS (SRS), a primary synchronization signal (PSS), a secondary synchronization signal (SSS), a channel state information-RS (CSI-RS), or an RS for NC, and wherein the information indicating the type of the first RS indicates at least one type of a DMRS, an SRS, a PSS, an SSS, a CSI-RS, or an RS for NC.

20. The BS of claim 17, wherein the type of the second RS or the type of the first RS is determined based on an index value.

\* \* \* \* \*